United States Patent
Shin et al.

(10) Patent No.: US 9,842,490 B2
(45) Date of Patent: Dec. 12, 2017

(54) SYSTEM AND METHOD OF CONTROLLING EXTERNAL APPARATUS CONNECTED WITH DEVICE

(71) Applicant: SAMSUNG ELECTRONICS CO., LTD., Suwon-si (KR)

(72) Inventors: Hang-sik Shin, Yongin-si (KR); Jae-woo Ko, Uiwang-si (KR); Se-jun Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 176 days.

(21) Appl. No.: 14/022,556

(22) Filed: Sep. 10, 2013

(65) Prior Publication Data

US 2014/0070925 A1    Mar. 13, 2014

(30) Foreign Application Priority Data

Sep. 10, 2012  (KR) .................. 10-2012-0099739

(51) Int. Cl.

| G05B 11/01 | (2006.01) |
|---|---|
| G08C 17/02 | (2006.01) |
| G05B 15/02 | (2006.01) |
| H04L 29/08 | (2006.01) |

(52) U.S. Cl.
CPC ............. *G08C 17/02* (2013.01); *G05B 15/02* (2013.01); *H04L 67/303* (2013.01)

(58) Field of Classification Search
CPC ........ G08C 17/02; H04L 67/303; G05B 15/02
USPC ....................................................... 340/12.5
See application file for complete search history.

(56) References Cited

U.S. PATENT DOCUMENTS

| 6,229,430 | B1* | 5/2001 | Dewey ................. G04G 13/026 340/286.02 |
|---|---|---|---|
| 8,195,203 | B1* | 6/2012 | Tseng ................ H04M 1/72569 455/414.3 |
| 9,332,392 | B1* | 5/2016 | Conway ................ H04W 4/025 |
| 2003/0001727 | A1* | 1/2003 | Steinmark .............. G08B 21/24 340/309.16 |

(Continued)

FOREIGN PATENT DOCUMENTS

| CN | 101478403 A | 7/2009 |
|---|---|---|
| KR | 10-2004-0019746 A | 3/2004 |

(Continued)

OTHER PUBLICATIONS

International Search Report (PCT/ISA/210), dated Jan. 16, 2014, issued by the International Searching Authority in counterpart International Patent Application No. PCT/KR2013/008143.

(Continued)

*Primary Examiner* — Naomi Small
(74) *Attorney, Agent, or Firm* — Sughrue Mion, PLLC

(57) ABSTRACT

A method of controlling an external apparatus connected with a device includes: providing user input information used to determine a user's intention; identifying an external apparatus controllable by a device; providing apparatus information of the identified external apparatus; receiving control information about the external apparatus, which is generated based on the based on the user's intention and the apparatus information; and transmitting a control command to the external apparatus which is generated based on the received control information.

30 Claims, 13 Drawing Sheets

(56) References Cited

U.S. PATENT DOCUMENTS

| | | |
|---|---|---|
| 2003/0033152 A1* | 2/2003 | Cameron ................ G10L 15/26 704/275 |
| 2003/0187646 A1 | 10/2003 | Smyers et al. |
| 2006/0259201 A1 | 11/2006 | Brown |
| 2006/0293608 A1* | 12/2006 | Rothman ............ A61B 5/4812 600/545 |
| 2010/0069054 A1 | 3/2010 | Labidi et al. |
| 2010/0241699 A1 | 9/2010 | Muthukumarasamy et al. |
| 2010/0279673 A1* | 11/2010 | Sharp .................... H04L 67/125 455/419 |
| 2011/0187864 A1* | 8/2011 | Snider ..................... H04N 7/18 348/158 |
| 2012/0072951 A1* | 3/2012 | King ..................... G08C 17/02 725/37 |
| 2012/0092171 A1* | 4/2012 | Hwang ................. G06F 19/345 340/575 |
| 2012/0127012 A1 | 5/2012 | Gicklhorn et al. |
| 2012/0139703 A1 | 6/2012 | Szoke et al. |
| 2012/0200497 A1 | 8/2012 | Nasiri et al. |
| 2012/0226981 A1 | 9/2012 | Clavin |
| 2012/0300598 A1* | 11/2012 | Murray ................. G04G 13/02 368/251 |

FOREIGN PATENT DOCUMENTS

| | | |
|---|---|---|
| KR | 10-2005-0045698 A | 5/2005 |
| RU | 2006123259 A | 1/2008 |
| RU | 119473 U1 | 8/2012 |

OTHER PUBLICATIONS

Written Opinion (PCT/ISA/237), dated Jan. 16, 2014, issued by the International Searching Authority in counterpart International Patent Application No. PCT/KR2013/008143.

Communication, dated Dec. 13, 2013, issued by the European Patent Office in counterpart European Patent Application No. 13183694.2.

Ruta, Michele, et al., "An Agent Framework for Knowledge-based Homes," ATES 2012, XP-002716710, Jun. 5, 2012, 8 pages, http://www.ates2012.org/papers/paper5.pdf.

Communication issued Apr. 18, 2016, issued by the Federal Service on Intellectual Property in counterpart Russian Patent Application No. 2015108021.

Communication dated Aug. 1, 2017, issued by the State Intellectual Property Office of P.R. China in counterpart Chinese application No. 201380047103.7.

* cited by examiner

FIG. 6

| User Input Information | User's Intention | External Apparatus Controlling Condition | Operation |
|---|---|---|---|
| Wake me up at 7:00 if it doesn't rain tomorrow | When: tomorrow, 7:00 Condition: if it doesn't rain Do: wake me up | Who: x What: weather When: tomorrow Condition: sunny, cloudy Where: device location | check time check device location check weather output alarm information |
| Let's go home if the traffic is not heavy before 20:00 tomorrow | When: tomorrow, before 20:00 Condition: if the traffic is not heavy Do: let's go home | Who: x What: traffic When: tomorrow, before 20:00 Condition: light traffic Where: from device location to home | check time check traffic from device location to home start an engine output route guidance information |
| Give me a video call if the baby wakes up | Condition: if the baby wakes up Do: give me a video call | Who: baby What: x When: x Condition: wakes up where: x | obtain image captured inside house obtain voice data inside house check state of baby make a video call |
| ... | ... | ... | ... |

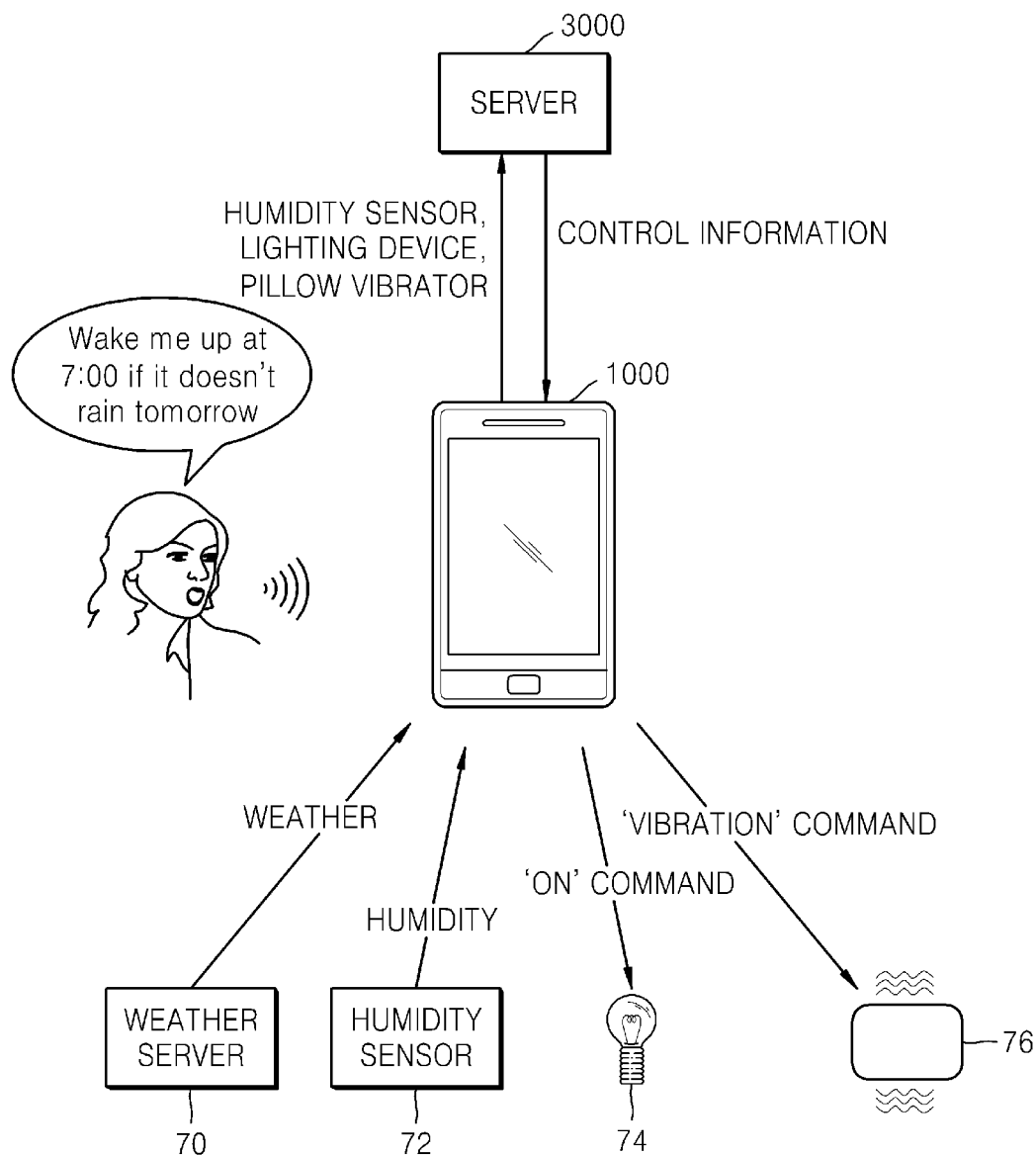

SYSTEM AND METHOD OF CONTROLLING EXTERNAL APPARATUS CONNECTED WITH DEVICE

CROSS-REFERENCE TO RELATED PATENT APPLICATION

This application claims priority from the Korean Patent Application No. 10-2012-0099739, filed on Sep. 10, 2012, in the Korean Intellectual Property Office, the disclosure of which is incorporated herein in its entirety by reference.

BACKGROUND

1. Field

Apparatuses and methods consistent with exemplary embodiments relate to controlling an external apparatus connected with a device according to a user's intention.

2. Description of the Related Art

Due to development of natural language analysis technologies and mobile technologies, a device may analyze information input by a user and may operate according to the user's intention. However, even though a device may be able to operate according to a user's intention, it is difficult for the device to utilize various connectable or device-compliant apparatuses. As such, it is difficult to control a device by effectively reflecting various true intentions of a user.

Accordingly, there is a need for methods and apparatuses for obtaining various types of condition information by using a device and an external apparatus connectable with the device and for operating the device and different external apparatuses by effectively reflecting various intentions of a user.

SUMMARY

Exemplary embodiments may address at least the above problems and/or disadvantages and other disadvantages not described above. The exemplary embodiments are not required to overcome the disadvantages described above, and an exemplary embodiment may not overcome any of the problems described above.

One or more exemplary embodiments provide a system and method of controlling an external apparatus connected with a device by determining a user's intention based on user input information, and controlling the device and the external apparatus according to the user's intention.

According to an aspect of an exemplary embodiment, there is provided a method of controlling an external apparatus performed by a device, the method including providing to a server user input information used to determine a user's intention; checking at least one external apparatus controllable by the device; providing apparatus information of the checked external apparatus to the server; receiving from the server control information about the external apparatus, wherein the control information is generated based on the user input information and the apparatus information by the server; and transmitting a control command to the at least one external apparatus based on the received control information, wherein the control information is generated by the server based on the user's intention.

A condition for controlling the external apparatus may be determined by the server based on the user's intention, and the control information may be generated by the server based on the determined condition.

The control information may include information for checking whether the determined condition is satisfied, and information for controlling operation of at least one of the device and the external apparatus if the determined condition is satisfied.

The method may further include obtaining condition information related to the determined condition, and the transmitting of the control command may include transmitting the control command to the external apparatus if it is checked that the determined condition is satisfied based on the obtained condition information.

The obtaining of the condition information may include obtaining the condition information from the at least one external apparatus.

The condition information may include information about at least one of a location of the device, an environment around the device, weather, time, temperature, humidity, and illumination at the location of the device, and traffic at a preset location.

The user input information may include information about at least one of text input by the user, a voice of the user, and a gesture of the user.

The apparatus information may include information about at least one of an identification value of the external apparatus, a type of the external apparatus, and a command used to control the external apparatus.

An external apparatus related to the user's intention may be selected from among a plurality of external apparatuses, and the control command may be a command for operating the selected external apparatus.

The method may further include, if an external apparatus is additionally connected with the device, providing apparatus information of the additionally connected external apparatus to the server, and the control information including a control command about the additionally connected external apparatus may be generated by the server.

According to another aspect of an exemplary embodiment, there is provided a method of providing control information for controlling an external apparatus to a device performed by a server, the method including receiving user input information from the device; receiving from the device apparatus information of at least one external apparatus controllable by the device; determining a user's intention based on the user input information; generating control information about the external apparatus based on the determined user's intention and the apparatus information; and providing the control information to the device.

The method may further include determining a condition for controlling the external apparatus, based on the user's intention, and the generating of the control information may include generating the control information based on the determined condition.

The control information may include information for checking whether the determined condition is satisfied, and information for controlling operation of at least one of the device and the external apparatus if the determined condition is satisfied.

Condition information related to the determined condition may be obtained by the device based on the control information, and the control command may be transmitted from the device to the external apparatus if it is checked that the determined condition is satisfied based on the obtained condition information.

The condition information may be obtained by the device by using the at least one external apparatus.

The condition information may include information about at least one of a location of the device, an environment around the device, weather, time, temperature, humidity, and illumination at the location of the device, and traffic at a preset location.

The user input information may include information about at least one of text input by the user, a voice of the user, and a gesture of the user.

The apparatus information may include information about at least one of an identification value of the external apparatus, a type of the external apparatus, and a command used to control the external apparatus.

An external apparatus related to the user's intention may be selected from among a plurality of external apparatuses, and the control information may be information for operating the selected external apparatus.

The receiving of the apparatus information may include, if an external apparatus is additionally connected with the device, receiving apparatus information of the additionally connected external apparatus from the device, and the generating of the control information may include generating the control information including a control command about the additionally connected external apparatus.

According to another aspect of an exemplary embodiment, there is provided a device including a memory for storing at least one program; and a processor for controlling an external apparatus by executing the at least one program, wherein the at least one program includes commands instructing to check at least one external apparatus controllable by the device; provide apparatus information of the checked external apparatus to a server; receive from the server control information about the external apparatus, which is generated based on the user input information and the apparatus information; and transmit a control command to the at least one external apparatus based on the received control information, and wherein the user input information may be used when the server determines a user's intention, and the control information may be generated by the server based on the user's intention.

A condition for controlling the external apparatus may be determined by the server based on the user's intention, and the control information may be generated by the server based on the determined condition.

The control information may include information for checking whether the determined condition is satisfied, and information for controlling operation of at least one of the device and the external apparatus if the determined condition is satisfied.

According to another aspect of an exemplary embodiment, there is provided a computer-readable recording medium having recorded thereon a computer program for executing the above method.

BRIEF DESCRIPTION OF THE DRAWINGS

The above and/or other aspects will become more apparent by describing certain exemplary embodiments, with reference to the accompanying drawings, in which:

FIG. 6 is an operation table, according to an exemplary embodiment;

FIG. 7 is a schematic diagram of controlling an external apparatus, according to an exemplary embodiment;

DETAILED DESCRIPTION

Figure 1:
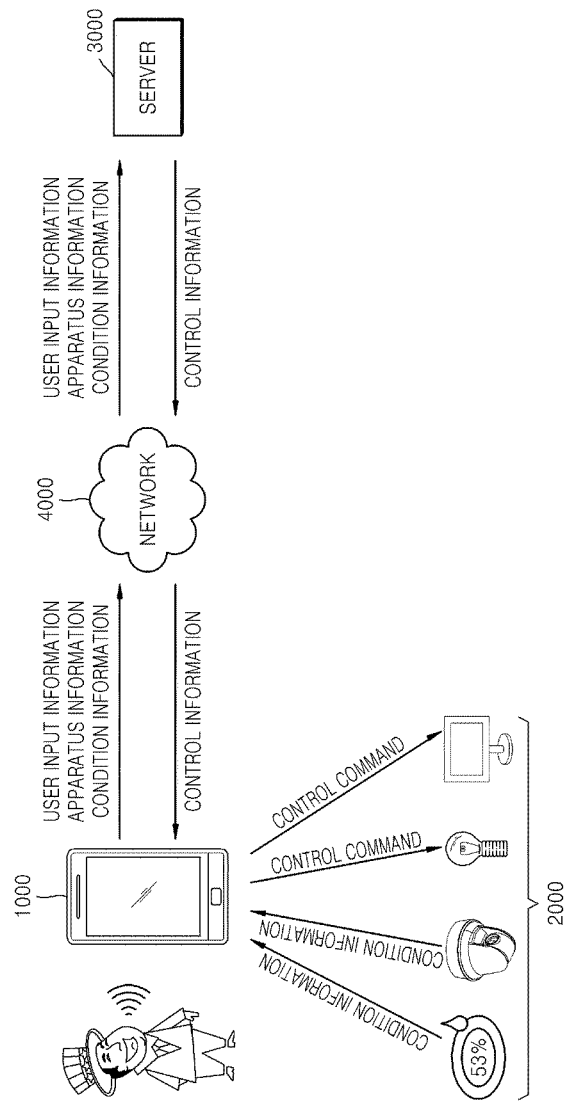
FIG. 1 is an overall schematic diagram of a system for controlling an external apparatus via a device, according to an exemplary embodiment.

Certain exemplary embodiments are described in greater detail below with reference to the accompanying drawings.

In the following description, the same drawing reference numerals are used for the same elements even in different drawings. The matters defined in the description, such as detailed construction and elements, are provided to assist in a comprehensive understanding of exemplary embodiments. Thus, it is apparent that exemplary embodiments can be carried out without those specifically defined matters. Also, well-known functions or constructions are not described in detail since they would obscure exemplary embodiments with unnecessary detail.

Throughout the specification, it should be understood that when an element is referred to as being "connected with" another element, it can be directly connected with the other element, or electrically connected with the other element while intervening elements may also be present. Also, when a part "includes" or "comprises" an element, unless there is a particular description contrary thereto, the part can further include other elements, not excluding the other elements.

Expressions such as "at least one of," when preceding a list of elements, modify the entire list of elements and do not modify the individual elements of the list.

FIG. 1 is an overall schematic diagram of a system for controlling an external apparatus 2000 via a device 1000, according to an exemplary embodiment.

As illustrated in FIG. 1, the system includes the device 1000, one or more external apparatuses 2000 connected with the device 1000, a server 3000, and a network 4000.

Referring to FIG. 1, the device 1000 may generate user input information based on a user input, and may provide the user input information, apparatus information of the external apparatus 2000, and condition information to the server 3000 such that the external apparatus 2000 may be controlled according to a user's intention.

The device 1000 may receive a text input or a voice input of the user, may generate the user input information based on the received input, and may provide the generated user input information to the server 3000. The device 1000 may check the external apparatus 2000 connectable with the device 1000, and may obtain and provide the apparatus information of the external apparatus 2000 to the server 3000. Furthermore, the device 1000 may obtain the condition information via the device 1000 or the external apparatus 2000, and may provide the obtained condition information to the server 3000. The device 1000 may obtain the condition information based on control information to be described below, but is not limited thereto.

The server 3000 may analyze the user's intention based on the user input information, and may generate and provide the control information to the device 1000 such that the device 1000 may operate according to the user's intention and that the external apparatus 2000 may be controlled by the device 1000. The server 3000 may determine the user's intention by analyzing the user input information, and may determine a condition for controlling the external apparatus 2000 in such a way that the user's intention is satisfied. The server 3000 may check whether the determined condition is satisfied and may generate the control information for controlling operations of the device 1000 and the external apparatus 2000.

The device 1000 may receive the control information from the server 3000, and may transmit a control command to some external apparatuses 2000 based on the control information.

The device 1000 is an apparatus capable of transmitting and receiving information to and from the server 3000 and of transmitting the control command to the external apparatus 2000, and may be, for example, a smartphone, a mobile phone, a personal digital assistant (PDA), a laptop computer, a media player, a global positioning system (GPS) apparatus, or another mobile or non-mobile computing apparatus, but is not limited thereto.

The external apparatus 2000 may be an apparatus connectable with and controllable by the device 1000, and/or capable of at least partially sharing functions provided by the device 1000. The external apparatus 2000 may be a stand-alone apparatus capable of independently executing an application, but is not limited thereto. The external apparatus 2000 may include an input apparatus, an output apparatus, or a control apparatus, for example, a home appliance such as a smart TV or an air conditioner, a security camera, a recorder, a mobile phone, a personal computer (PC), a pillow vibrator, a motor vehicle, a navigator, a microphone, a speaker, a pedal, a joystick, a musical instrument (e.g., a piano, an organ, an electronic keyboard, a guitar, a violin, or a cello), a game manipulator, a doll, a medical appliance, sporting equipment, a camera, or a sensor.

The server 3000 may be a service providing server for providing the control information for allowing the device 1000 to control the external apparatus 2000 according to the user's intention, but is not limited thereto.

The server 3000 may be a cloud server, for example, a PC of the user. If the server 3000 is a cloud server, the server 3000 may include a predetermined intelligence engine, may analyze the user's intention via the intelligence engine, and may transmit the control information for controlling the external apparatus 2000 to the device 1000. Otherwise, if the server 3000 is a client server, the server 3000 may receive predetermined information from a separate service providing server (e.g., a weather information providing server or a traffic information providing server).

The network 4000 may be implemented as a wired network such as a local area network (LAN), a wide area network (WAN), or a value added network (VAN), or a wireless network such as a mobile radio communication network, a near field communication (NFC) network, or a satellite communication network. The network 4000 may be a comprehensive data communication network for allowing appropriate communications between the network components illustrated in FIG. 1, and may include wired Internet, wireless Internet, and/or a mobile wireless communication network.

Figure 2:
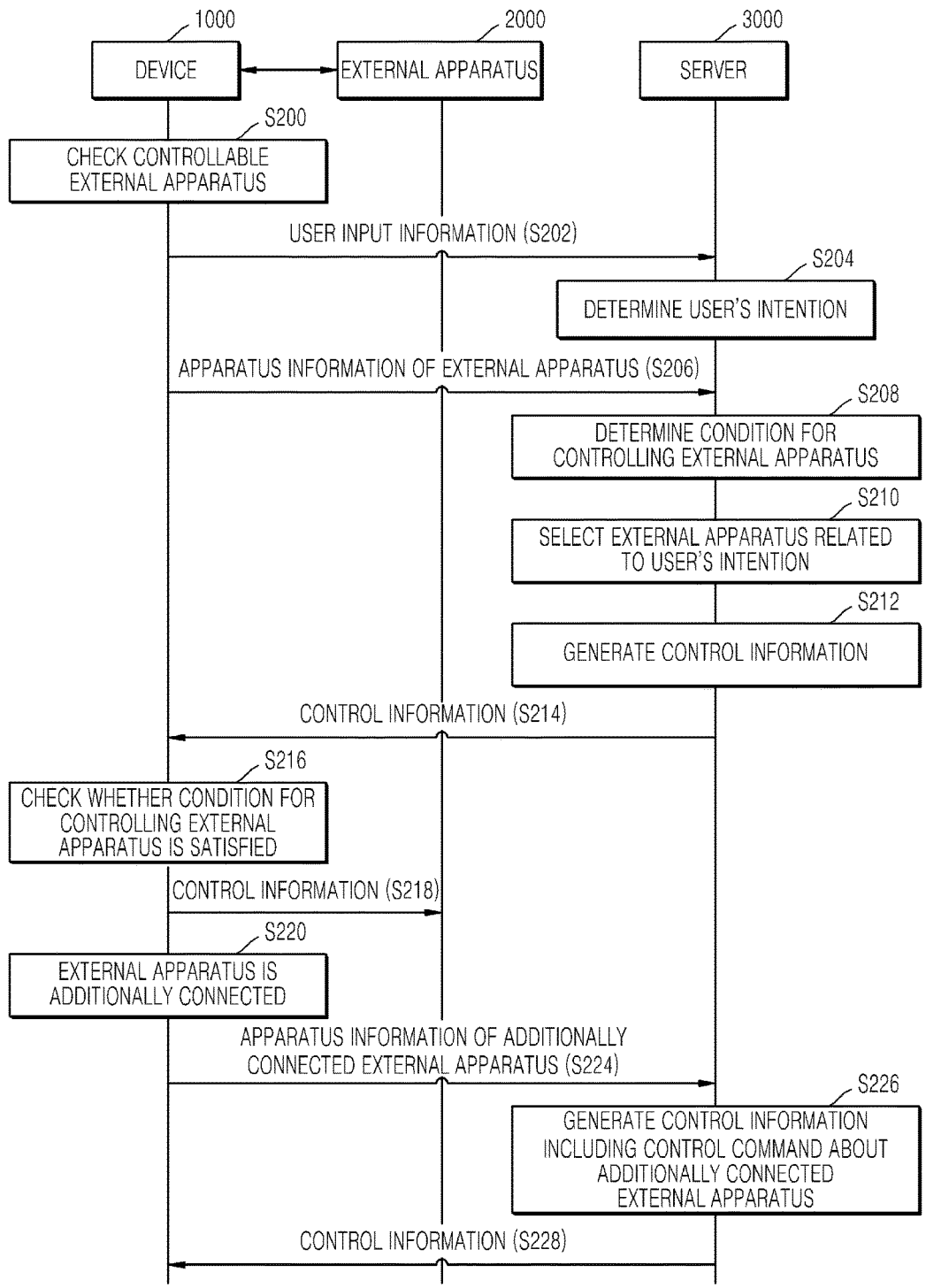
FIG. 2 is a flowchart of a method of controlling an external apparatus by a device, according to an exemplary embodiment.

FIG. 2 is a flowchart of a method of controlling the external apparatus 2000 by the device 1000 based on control information generated by the server 3000, according to an exemplary embodiment.

In operation S200, the device 1000 checks the external apparatus 2000 controllable by the device 1000. The device 1000 may check the external apparatus 2000 controllable by the device 1000 from among the external apparatuses 2000 connectable with the device 1000. The controllable external apparatus 2000 may be an external apparatus connected or connectable with the device 1000 and having installed therein a predetermined application for utilizing a control service according to an exemplary embodiment. If the application is not installed in the controllable external apparatus 2000, the device 1000 may perform communication connection and pairing with the external apparatus 2000, and may provide to the external apparatus 2000 the application or link information for downloading the application.

The external apparatus 2000 may include, for example, a home appliance such as a smart TV or an air conditioner, a security camera, a recorder, a mobile phone, a PC, a pillow vibrator, a motor vehicle, or a navigator, but is not limited thereto. The device 1000 and the external apparatus 2000 may be connected with each other via a wired network such as a LAN, a WAN, or a VAN, or a wireless network such as a mobile radio communication network, an NFC network, or a satellite communication network. The device 1000 may be connected with the external apparatus 2000 via, for example, a home gateway (not shown).

The device 1000 may receive from the checked external apparatus 2000 apparatus information of the external apparatus 2000, but is not limited thereto. The device 1000 may receive the apparatus information of the external apparatus 2000 from a separate server (not shown). For example, if the device 1000 is connected with the external apparatus 2000 via a home gateway (not shown), the device 1000 may request the home gateway for the apparatus information of the external apparatus 2000. The apparatus information of the external apparatus 2000 may include information about at least one of an identification value of the external apparatus 2000, a media access control (MAC) address, a service set identifier (SSID), the type of the external apparatus 2000, capability provided by the external apparatus 2000, a category, and a command used to control the external apparatus 2000. The capability provided by the external apparatus 2000 may include, for example, a voice output capability, a video output capability, a voice recording capability, an image capturing capability, and a humidity sensing capability, but is not limited thereto.

After user input information is generated in operation S202 or a user's intention is determined in operation S204, the device 1000 may search for the external apparatus 2000 to be controlled by the device 1000, based on the user input information or the user's intention.

In operation S202, the device 1000 provides the user input information to the server 3000. The device 1000 may generate the user input information based on a user input, and may provide the generated input information to the server 3000. The user input information may be information about at least one of text input by the user, a voice of the user, a facial expression of the user, a gesture of the user, and a physical state of the user.

If the user inputs text to the device 1000, the device 1000 may provide the text data input by the user as the user input information to the server 3000. For example, if the user inputs text such as "Wake me up at 7:00 if it doesn't rain tomorrow" to the device 1000, the device 1000 may provide the input text data as the user input information to the server 3000. Otherwise, if the user inputs a voice to the device 1000, the device 1000 may provide the input voice data as the user input information to the server 3000. The device 1000 may transform the input voice data into text data, and may transmit the transformed text data as the user input information to the server 3000. Alternatively, for example, the device 1000 may generate the user input information by using an email or a text message stored in the device 1000.

The device 1000 may parse the user input information, and may transmit the parsed data to the server 3000. If the user input information is text data, the device 1000 may parse the text data. Otherwise, if the user input information is voice data, the device 1000 may transform the voice data into text data and may parse the transformed text data. However, an exemplary embodiment is not limited thereto. The device 1000 may provide a voice data file to the server 3000, and the server 3000 may transform and parse the received voice data file into text.

In operation S204, the server 3000 determines the user's intention based on the user input information. The server 3000 may determine the user's intention by analyzing the user input information. In order to analyze received text data as the user input information, the server 3000 may use various natural language analysis methods. For example, the server 3000 may analyze the text data by using natural language processing such as morpheme analysis, syntax analysis, or named entity recognition. Alternatively, the server 3000 may determine the user's intention based on the user input information by using, for example, ontology-based reasoning and probability-based reasoning. If the server 3000 receives voice data as the user input information, the server 3000 may transform the received voice data into text data, and may analyze the transformed text data. The server 3000 may generate user intention information by analyzing the user input information. For example, if the user input information is "Wake me up at 7:00 if it doesn't rain tomorrow", the server 3000 may generate the user intention information including time information such as "tomorrow, 7:00", information related to condition information such as "if it doesn't rain", and operation information such as "wake me up". The information related to condition information may be information used by the device 1000 or the server 3000 to obtain condition information about the user's intention.

Alternatively, the server 3000 may determine the user's intention via an interactive interface using feedback. For example, if the user's intention is not easily determined based on the user input information received from the device 1000, the server 3000 may request the device 1000 for additional user input information. The server 3000 may notify additionally needed information to the device 1000. The server 3000 may determine the user's intention by using the user input information additionally received from the device 1000. For example, if user input information such as "Give me a call if the baby wakes up" is received from the device 1000, the server 3000 may request the device 1000 to additionally provide information about a point of time when the baby wakes up. The device 1000 may additionally provide user input information such as "Give me a call if the baby wakes up tomorrow morning" to the server 3000, and the server 3000 may determine the user's intention based on the additionally received user input information.

In operation S206, the device 1000 provides the apparatus information of the checked external apparatus 2000 to the server 3000. The device 1000 may provide information about at least one of an identification value of the external apparatus 2000, a MAC address, an SSID, the type of the external apparatus 2000, capability provided by the external apparatus 2000, a category, and a command used to control the external apparatus 2000 to the server 3000. In operation S206, the device 1000 may provide the apparatus information of the device 1000 to the server 3000. The apparatus information of the device 1000 may include information about at least one of, for example, an identification value of the device 1000, a MAC address, an SSID, the type of the device 1000, capability provided by the device 1000, a category, and a command used to control the device 1000.

In operation S208, the server 3000 determines a condition for controlling the external apparatus 2000 based on the user's intention. The condition for controlling the external apparatus 2000 is a condition for allowing a user-desired operation to be performed according to the user's intention. For example, if the user input information is "Wake me up if it doesn't rain at 7:00 tomorrow", a condition such as "if it doesn't rain at 7:00 tomorrow" for a user-desired operation such as "wake me up" may be the condition for controlling the external apparatus 2000. The server 3000 may determine a condition that has to be satisfied to control operation of the external apparatus 2000 or the device 1000, based on the user intention information. For example, if the user intention information includes time information such as "tomorrow, 7:00" and information related to condition information such as "if it doesn't rain", the server 3000 may determine a time condition such as "tomorrow", a weather condition such as "sunny, cloudy", and a place condition such as "device location" as the condition for controlling the external apparatus 2000. In order to ensure that the determined condition is satisfied, a predetermined external apparatus 2000 may be controlled.

In operation S210, the server 3000 selects the external apparatus 2000 related to the user's intention. The server 3000 may select the external apparatus 2000 related to the user's intention, based on operation information included in the user intention information and the apparatus information received from the device 1000. For example, if the user intention information includes operation information such as "wake me up", the server 3000 may select the external apparatus 2000 to wake up the user, by using the apparatus information received from the device 1000. The server 3000 may select, for example, a pillow vibrator and/or a lighting device as the external apparatuses 2000 for waking up the user.

In operation S212, the server 3000 generates control information for satisfying the user's intention. The control information may include information for checking whether the condition determined by the server 3000 is satisfied, and information for controlling operation of at least one of the device 1000 and the selected external apparatus 2000 if the condition determined by the server 3000 is satisfied. The control information may include a control command for controlling operation of the device 1000 or the external apparatus 2000, and information to generate the control command.

In more detail, the server 3000 may generate the control information for checking whether the condition determined by the server 3000 is satisfied, based on the condition determined by the server 3000 and the apparatus information received from the device 1000. For example, if the condition determined by the server 3000 includes a time condition such as "tomorrow", a weather condition such as "sunny, cloudy", and a place condition such as "device location", the server 3000 may generate the control information for checking whether the condition determined by the server 3000 is satisfied by allowing the device 1000 to check the date, the location of the device 1000, and the weather via the device 1000 or the external apparatus 2000. The control information may include a control command instructing to check the date and the weather, a control command instructing to obtain humidity information from a humidity sensor, and a command instructing to check the location of the device 1000, and the control commands included in the control information may be aligned in a predetermined order.

However, the control information is not limited thereto and may omit a control command but may include information referred to so as to generate a control command, for example, "determine whether the weather is sunny or cloudy at a device location tomorrow".

If the condition determined by the server 3000 is satisfied, the server 3000 may generate the control information for operating the device 1000 or the external apparatus 2000. The server 3000 may generate the control information for operating the device 1000 or the external apparatus 2000, based on the operation information included in the user intention information and the apparatus information received from the device 1000. For example, if the user intention information includes operation information such as "wake me up", the server 3000 may generate a control command instructing the device 1000 to output alarm information, a control command instructing a lighting device to be turned on, and/or a control command instructing a pillow vibrator to generate vibration.

The control information may include a plurality of control commands for controlling operation of at least one of the device 1000 and the external apparatus 2000, and the plurality of control commands may be executed in a predetermined order by at least one of the device 1000 and the external apparatus 2000.

In operation S214, the server 3000 provides the generated control information to the device 1000.

In operation S216, the device 1000 checks whether the condition for controlling the external apparatus 2000 is satisfied. The device 1000 may check whether the condition determined by the server 3000 is satisfied, based on the control information received from the server 3000. If the control information received from the server 3000 includes a control command for checking whether the condition for controlling the external apparatus 2000 is satisfied, the device 1000 may operate according to the control command included in the control information to check whether the condition is satisfied. Otherwise, if the control information received from the server 3000 does not include the control command for checking whether the condition for controlling the external apparatus 2000 is satisfied, the device 1000 may generate a control command based on the control information, and may check whether the condition is satisfied, according to the generated control command.

In operation S218, the device 1000 provides the control command to the external apparatus 2000 based on the control information. The device 1000 may transmit the control command to the external apparatus 2000 in order to follow the user's intention if the condition for controlling the external apparatus 2000 is satisfied. If the condition for controlling the external apparatus 2000 is satisfied, the device 1000 may transmit the control commands for operating the external apparatuses 2000 to the external apparatuses 2000 in a predetermined order. The device 1000 may perform a predetermined operation based on the control information.

In operation S220, another external apparatus (not shown) is additionally connected with the device 1000 and, in operation S224, the device 1000 provides apparatus information of the additionally connected external apparatus to the server 3000.

In operation S226, the server 3000 generates control information including a control command about the additionally connected external apparatus. The server 3000 may change the control information for satisfying the user's intention, based on the apparatus information of the additionally connected external apparatus.

In operation S228, the server 3000 provides the changed control information to the device 1000. As such, the device 1000 may control operation of the device 1000 or the external apparatus 2000 based on the changed control information.

Figure 3:
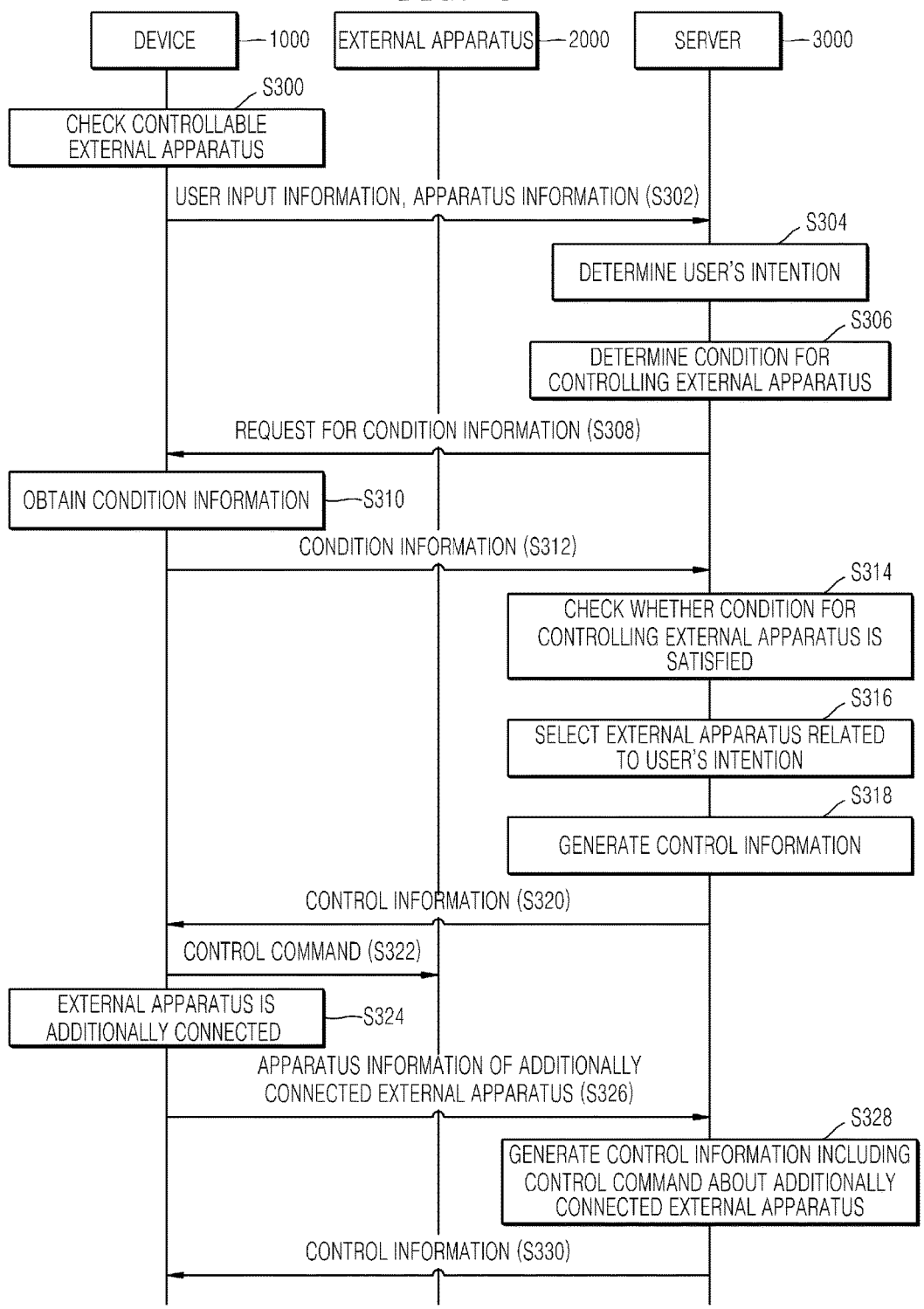
FIG. 3 is a flowchart of a method of controlling an external apparatus by a device, according to an exemplary embodiment.

FIG. 3 is a flowchart of a method of controlling the external apparatus 2000 by the device 1000 based on control information generated by the server 3000, according to an exemplary embodiment. In FIG. 3, the server 3000 may check whether a condition for controlling the external apparatus 2000 is satisfied. Since some of the operations of FIG. 3 are similar to those described above with reference to FIG. 2, the detailed description thereof is omitted.

In operation S300, the device 1000 checks the external apparatus 2000 controllable by the device 1000.

In operation S302, the device 1000 provides user input information and the apparatus information to the server 3000. The device 1000 may generate the user input information based on a user input, and may provide the generated input information to the server 3000.

Also, the device 1000 may provide information about at least one of an identification value of the external apparatus 2000, the type of the external apparatus 2000, and a command used to control the external apparatus 2000 to the server 3000.

In operation S304, the server 3000 determines the user's intention based on the user input information. The server 3000 may determine the user's intention by analyzing the user input information. In order to analyze received text data as the user input information, the server 3000 may use various natural language analysis methods. For example, the server 3000 may analyze the text data by using natural language processing such as morpheme analysis, syntax analysis, or named entity recognition. If the server 3000 receives voice data as the user input information, the server 3000 may transform the received voice data into text data, and may analyze the transformed text data. Also, the server 3000 may generate user intention information by analyzing the user input information.

In operation S306, the server 3000 determines a condition for controlling the external apparatus 2000 based on the user's intention. The server 3000 may determine a condition that has to be satisfied to control operation of the external apparatus 2000 or the device 1000, based on the user intention information. For example, if the user intention information includes time information such as "tomorrow, 7:00" and information related to condition information such as "if it doesn't rain", the server 3000 may determine a time condition such as "tomorrow", a weather condition such as "sunny, cloudy", and a place condition such as "device location" as the condition for controlling the external apparatus 2000.

In operation S308, the server 3000 requests the device 1000 for condition information. The server 3000 may request the device 1000 for the condition information obtainable by the device 1000 and the condition information obtainable by the external apparatus 2000, based on the condition information. The server 3000 may request the device 1000 for the condition information needed to check whether the determined condition is satisfied. For example, if a time condition, a weather condition, and a place condition are determined, the server 3000 may request the device 1000 to provide information about the weather at a fixed time at a fixed place as the condition information to the server 3000. The server 3000 may provide the type of the condition information to the device 1000, but is not limited thereto. The server 3000 may provide to the device 1000 a control command instructing the device 1000 and the external apparatus 2000 to obtain the condition information.

In operation S310, the device 1000 obtains the condition information. The device 1000 may obtain the condition information in response to a request to obtain the condition information. The device 1000 may obtain various types of the condition information from the external apparatus 2000 and a separate server (not shown). For example, the device 1000 may obtain location information of the device 1000 from a location information providing server (not shown), may obtain weather information around the device 1000 from a weather server (not shown), and may obtain traffic information about a predetermined route from a traffic information providing server (not shown).

Also, for example, the device 1000 may obtain humidity information from a humidity sensor (not shown), may obtain a captured image from a photographing apparatus (not shown), and may obtain recorded voice data from a recording apparatus (not shown). The device 1000 may obtain the condition information from an apparatus included in the device 1000. For example, the device 1000 may obtain various types of the condition information from a temperature sensor, a humidity sensor, a geomagnetic sensor, a gravity sensor, a motion sensor, a gyro sensor, a camera, and a recorder included in the device 1000. The device 1000 may obtain the condition information about a physical state of the user. The condition information about the physical state of the user may be, for example, information about a heart rate, an electrocardiogram (ECG), breathing, a pulse, and physical exercise of the user, and may be obtained from the device 1000 or the external apparatus 2000 connected with the device 1000. Furthermore, the device 1000 may obtain the condition information about a network status, a login status of the external apparatus 2000, an application installed in the device 1000 or the external apparatus 2000, and a user using the application. However, the device 1000 is not limited thereto and may obtain various types of information as the condition information.

In operation S312, the device 1000 provides the obtained condition information to the server 3000. The device 1000 may obtain the condition information in a preset cycle, and may provide the obtained condition information to the server 3000 in real time, but is not limited thereto. The server 3000 may obtain the condition information from another device (not shown) or another server (not shown).

In operation S314, the server 3000 checks whether the condition for controlling the external apparatus 2000 is satisfied, based on the condition information. The server 3000 may check whether the condition is satisfied, based on the condition information received from at least one of the device 1000, the other device, and the other server.

In operation S316, the server 3000 selects the external apparatus 2000 related to the user's intention. The server 3000 may check an operation for satisfying the user's intention, and may select the external apparatus 2000 for performing the checked operation. For example, if the user intention information includes operation information such as "wake me up", the server 3000 may select a lighting device and/or a pillow vibrator.

In operation S318, the server 3000 generates control information about the selected external apparatus 2000. If the condition determined by the server 3000 is satisfied, the server 3000 may generate the control information for operating the device 1000 or the external apparatus 2000. The server 3000 may generate the control information for operating the device 1000 or the external apparatus 2000, based on the operation information included in the user intention information and the apparatus information received from the device 1000. For example, if the user intention information includes operation information such as "wake me up", the server 3000 may generate a control command instructing the device 1000 to output alarm information, a control command instructing a lighting device to be turned on, and a control command instructing a pillow vibrator to generate vibration. The control commands included in the control information generated by the server 3000 may be aligned in a predetermined order.

In operation S320, the server 3000 provides the generated control information to the device 1000.

In operation S322, the device 1000 transmits the control command to the external apparatus 2000 based on the control information. The device 1000 may transmit the control commands for operating the external apparatuses 2000 to the external apparatuses 2000 in a predetermined order. The device 1000 may perform a predetermined operation based on the control information.

In operation S324, another external apparatus (not shown) is additionally connected with the device 1000 and, in operation S326, the device 1000 provides apparatus information of the additionally connected external apparatus to the server 3000.

In operation S328, the server 3000 generates control information including a control command about the additionally connected external apparatus. The server 3000 may change the control information for satisfying the user's intention, based on the apparatus information of the additionally connected external apparatus.

In operation S330, the server 3000 provides the changed control information to the device 1000. As such, the device 1000 may control operation of the device 1000 or the external apparatus 2000 based on the changed control information.

Figure 4:
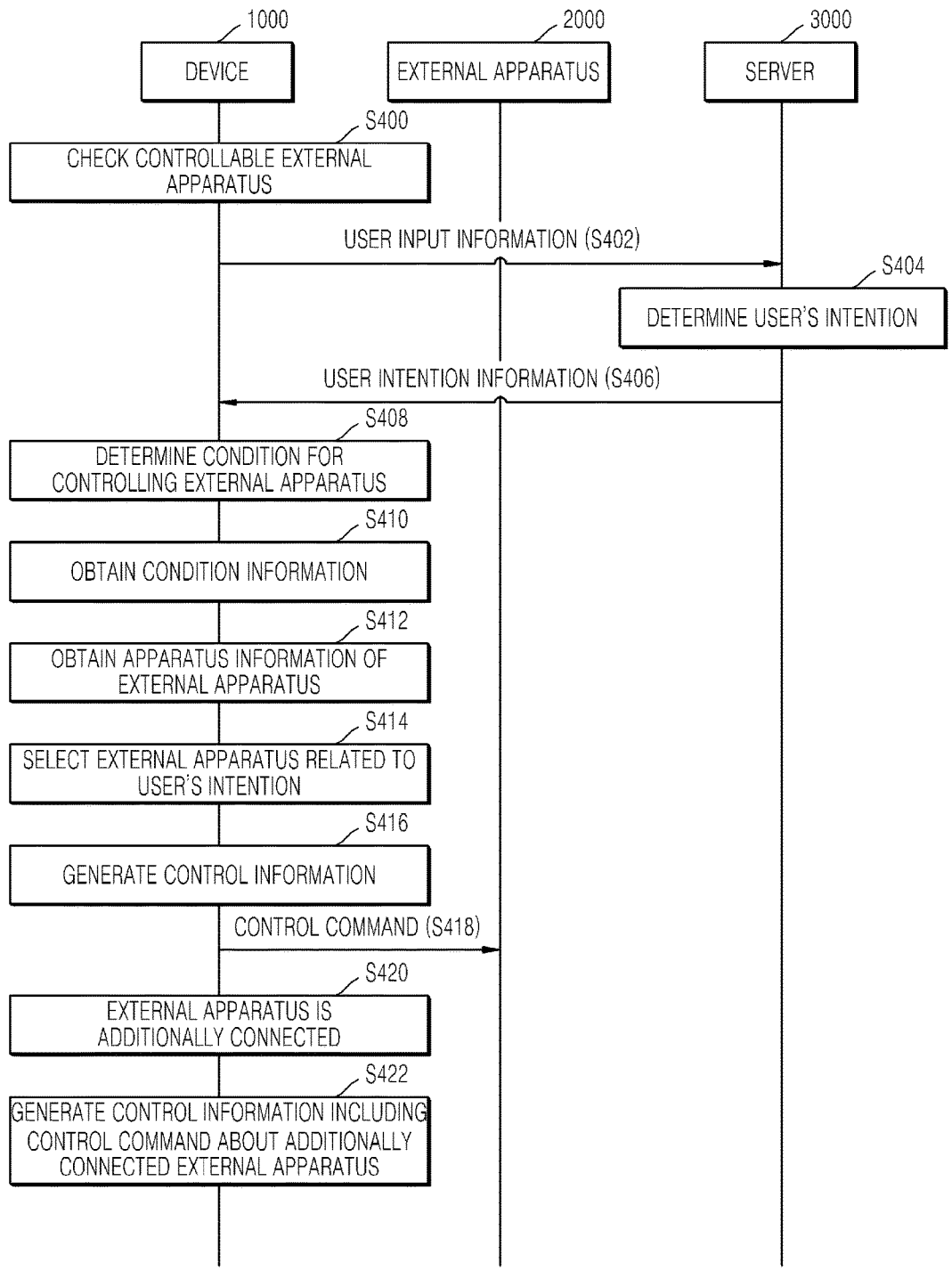
FIG. 4 is a flowchart of a method of controlling an external apparatus by a device, according to an exemplary embodiment.

FIG. 4 is a flowchart of a method of generating a control command and controlling the external apparatus 2000 by the device 1000 based on user intention information received from the server 3000, according to an exemplary embodiment. In FIG. 4, the device 1000 may determine a condition for controlling the external apparatus 2000, based on the user intention information. Since some of the operations of FIG. 4 are similar to those described above with reference to FIGS. 2 and 3, the detailed description thereof is omitted.

In operation S400, the device 1000 checks the external apparatus 2000 controllable by the device 1000 and, in operation S402, the device 1000 provides user input information to the server 3000. In operation S404, the server 3000 determines a user's intention based on the user input information. Operations S400, S402, and S404 may respectively correspond to operations S200, S202, and S204.

In operation S406, the server 3000 provides user intention information to the device 1000. For example, if the user input information is "Wake me up at 7:00 if it doesn't rain tomorrow", the server 3000 may provide to the device 1000 the user intention information including time information such as "tomorrow, 7:00", condition information such as "if it doesn't rain", and operation information such as "wake me up".

In operation S408, the device 1000 determines a condition for controlling the external apparatus 2000 based on the user's intention. The device 1000 may decide a condition that has to be satisfied to control operation of the external apparatus 2000 or the device 1000, based on the user intention information. For example, if the user intention information includes time information such as "tomorrow, 7:00" and condition information such as "if it doesn't rain", the device 1000 may decide a time condition such as "tomorrow", a weather condition such as "sunny, cloudy", and a place condition such as "device location" as the condition for controlling the external apparatus 2000.

In operation S410, the device 1000 obtains condition information. The device 1000 may obtain various types of the condition information from the external apparatus 2000 and a separate server (not shown).

In operation S412, the device 1000 obtains apparatus information of the external apparatus 2000. The device 1000 may receive the apparatus information of the external apparatus 2000 from the external apparatus 2000, but is not limited thereto. The device 1000 may receive the apparatus information of the external apparatus 2000 from a separate server (not shown). For example, if the device 1000 is connected with the external apparatus 2000 via a home gateway (not shown), the device 1000 may request the home gateway for the apparatus information of the external apparatus 2000. The apparatus information of the external apparatus 2000 may include information about at least one of an identification value of the external apparatus 2000, the type of the external apparatus 2000, and a command used to control the external apparatus 2000.

In operation S414, the device 1000 selects the external apparatus 2000 related to the user's intention. The device 1000 may check an operation for satisfying the user's intention, and may select the external apparatus 2000 for performing the checked operation.

In operation S416, the device 1000 generates control information about the selected external apparatus 2000. If the condition determined by the device 1000 is satisfied, the device 1000 may generate the control information for operating the device 1000 or the external apparatus 2000. The device 1000 may generate the control information for operating the device 1000 or the external apparatus 2000, based on the operation information included in the user intention information and the apparatus information received from the device 1000. The control information may include control commands about at least one external apparatus 2000 and the device 1000, and the control commands may be aligned in a predetermined order.

In operation S418, the device 1000 provides a predetermined control command to the external apparatus 2000 based on the generated control information.

In operation S420, another external apparatus (not shown) is additionally connected with the device 1000 and, in operation S422, the device 1000 generates control information including a control command about the additionally connected external apparatus. The device 1000 may change the control information for satisfying the user's intention, based on apparatus information of the additionally connected external apparatus. As such, the device 1000 may control operation of the device 1000 or the external apparatus 2000 based on the changed control information.

Figure 5:
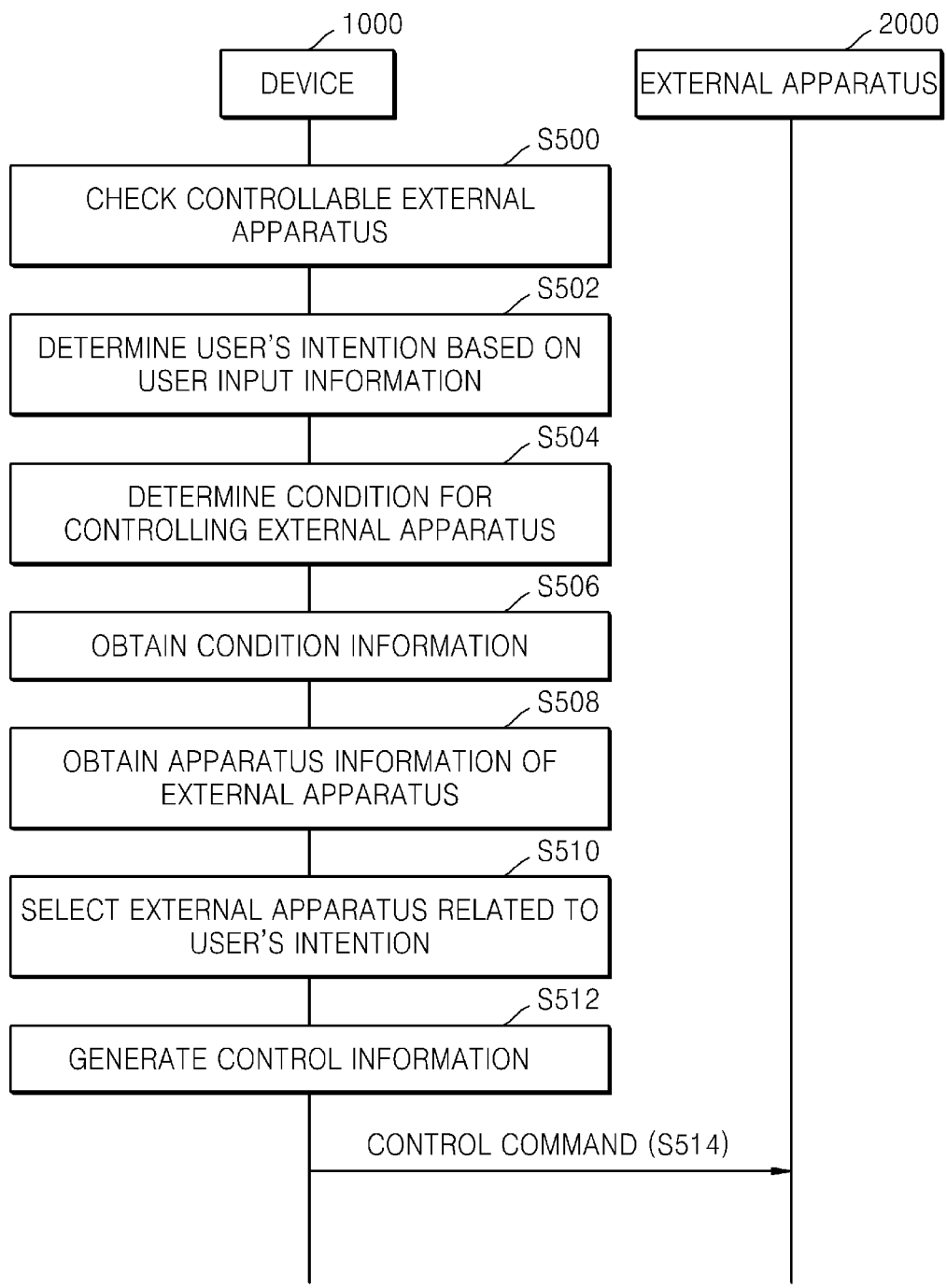
FIG. 5 is a flowchart of a method of controlling an external apparatus by a device, according to an exemplary embodiment.

FIG. 5 is a flowchart of a method of directly determining a user's intention and controlling the external apparatus 2000 by the device 1000 based on user input information, according to an exemplary embodiment.

In operation S500, the device 1000 checks the external apparatus 2000 controllable by the device 1000.

In operation S502, the device 1000 determines a user's intention based on user input information. The device 1000 may determine the user's intention by analyzing the user input information. In order to analyze the user input information, the device 1000 may use various natural language analysis methods. For example, the device 1000 may analyze text data as the user input information by using natural language processing such as morpheme analysis, syntax analysis, or named entity recognition. If the user input information is voice data, the device 1000 may transform the voice data into text data, and may analyze the transformed text data. The device 1000 may generate user intention information by analyzing the user input information. For example, if the user input information is "Wake me up at 7:00 if it doesn't rain tomorrow", the device 1000 may generate the user intention information including time information such as "tomorrow, 7:00", condition information such as "if it doesn't rain", and operation information such as "wake me up".

In operation S504, the device 1000 determines a condition for controlling the external apparatus 2000 based on the user's intention and, in operation S506, the device 1000 obtains condition information. In operation S508, the device 1000 obtains apparatus information of the external apparatus 2000, in operation S510, the device 1000 selects the external apparatus 2000 related to the user's intention and, in operation S512, the device 1000 generates control information about the selected external apparatus 2000. In operation S514, the device 1000 provides a predetermined control command to the external apparatus 2000 based on the generated control information.

Operations S504, S506, S508, S510, S512, and S514 may correspond to the operations described above with reference to FIGS. 2, 3, and 4, and thus, are not described in detail again.

FIG. 6 is an operation table of the device 1000 for controlling the external apparatus 2000, according to an exemplary embodiment. Information about operation of the device 1000 in relation to user input information is recorded in the operation table of the device 1000.

As illustrated in FIG. 6, the operation table 58 of the device 1000 may include a user input information field 60, a user's intention field 62, an external apparatus controlling condition field 64, and an operation field 66. The operation table of the device 1000 may be generated by at least one of the device 1000 and the server 3000.

User input information obtained by the device 1000 is recorded in the user input information field 60. If a user inputs text to the device 1000, the text data input by the user may be recorded in the user input information field 60. If the user input information is voice data, the voice data may be transformed into text data, and the transformed text data may be stored in the user input information field 60.

The user input information recorded in the user input information field 60 may include, for example, "Wake me up at 7:00 if it doesn't rain tomorrow", "Let's go home if the traffic is not heavy before 20:00 tomorrow", and "Give me a video call if the baby wakes up".

Information about a user's intention determined based on the user input information may be recorded in the user's intention field 62. The user input information may be analyzed by using natural language processing such as morpheme analysis, syntax analysis, or named entity recognition. For example, if the user input information is "Wake me up at 7:00 if it doesn't rain tomorrow", "When: tomorrow, 7:00, Condition: if it doesn't rain, Do: wake me up" may be recorded in the user's intention field 62.

Information about a condition that has to be satisfied to control the external apparatus 2000 according to the user's intention may be recorded in the external apparatus controlling condition field 64.

For example, based on the information recorded in the user's intention field 62, the external apparatus controlling condition field 64 may contain "Who: x, What: weather, When: tomorrow, Condition: sunny, cloudy, Where: device location". That is, a subject condition such as "weather", a time condition such as "tomorrow", a weather condition such as "sunny, cloudy", and a place condition such as "device location" may be recorded in the external apparatus controlling condition field 64. In addition to "Who", "What", "When", "Condition", and "Where", various condition items may be further included in the external apparatus controlling condition field 64. If predetermined data is not recorded as a condition item, the server 3000 may request the device 1000 for additional user input information about the condition item having no recorded data, and may receive the additional user input information from the device 1000 to record predetermined data as the condition item. That is, if the user's intention is not determined based on the user input information, or if a condition and operation for controlling the external apparatus 2000 according to the user's intention are not determined, the server 3000 may request the device 1000 for additional user input information.

The device 1000 may generate a control command for checking whether a predetermined condition is satisfied, based on the information recorded in the condition field 64.

Operation information of the device 1000 and the external apparatus 2000 for determining whether the condition for controlling the external apparatus 2000 is satisfied, and for operating the device 1000 and the external apparatus 2000 according to the user's intention may be recorded in the operation field 66.

For example, based on the information recorded in the user's intention field 62, "check time", "check device location", and "check weather" may be recorded in the operation field 66. If the condition for controlling the external apparatus 2000 is satisfied, as an operation of the device 1000 and the external apparatus 2000, "output alarm information" may be recorded in the operation field 66.

Based on the operation information recorded in the operation field 66, control information of the device 1000 and the external apparatus 2000 for performing the operation recorded in the operation field 66 may be generated. The control information may include a plurality of control commands for controlling operation of at least one of the device 1000 and the external apparatus 2000, and the plurality of control commands may be executed by at least one of the device 1000 and the external apparatus 2000 in a predetermined order. For example, based on "check time", "check device location" and "check weather" recorded in the operation field 66, a control command may be generated in such a way that the device 1000 checks the time, the location of the device 1000, and the weather by using at least one of the device 1000, a separate server (not shown), and the external apparatus 2000. For example, based on "output alarm information" recorded in the operation field 66, a control command may be generated in such a way that the device 1000 and the external apparatus 2000 output predetermined alarm information.

Although the device 1000 determines the user's intention and determines the condition and operation for controlling the external apparatus 2000 in the above description, exemplary embodiments are not limited thereto. The determining of the condition and operation for controlling the external apparatus 2000 based on the user input information by the device 1000 may be included in the determining of the user's intention.

FIG. 7 is a schematic diagram showing that the external apparatus 2000 is controlled according to user input information that is input to the device 1000, in a system for controlling the external apparatus 2000, according to an exemplary embodiment.

Referring to FIG. 7, if a user inputs voice data such as "Wake me up at 7:00 if it doesn't rain tomorrow" to the device 1000, the device 1000 may provide the voice data or text data transformed from the voice data, as user input information to the server 3000. The device 1000 may provide apparatus information of a humidity sensor 72, a lighting device 74, and a pillow vibrator 76 connectable with the device 1000, to the server 3000.

The server 3000 may determine the user's intention based on the user input information, and may determine a condition for controlling the external apparatus 2000. The server 3000 may determine whether the determined condition is satisfied, may generate control information for controlling the device 1000 and the external apparatus 2000, and may provide the generated control information to the device 1000.

The device 1000 may determine whether the condition is satisfied, by obtaining weather information from a weather server 70 based on the received control information, and obtaining humidity information from the humidity sensor 72. If the condition is satisfied, the device 1000 may transmit a control command instructing to power on to the lighting device 74 and/or may transmit a control command instructing to generate vibration to the pillow vibrator 76.

Figure 8:
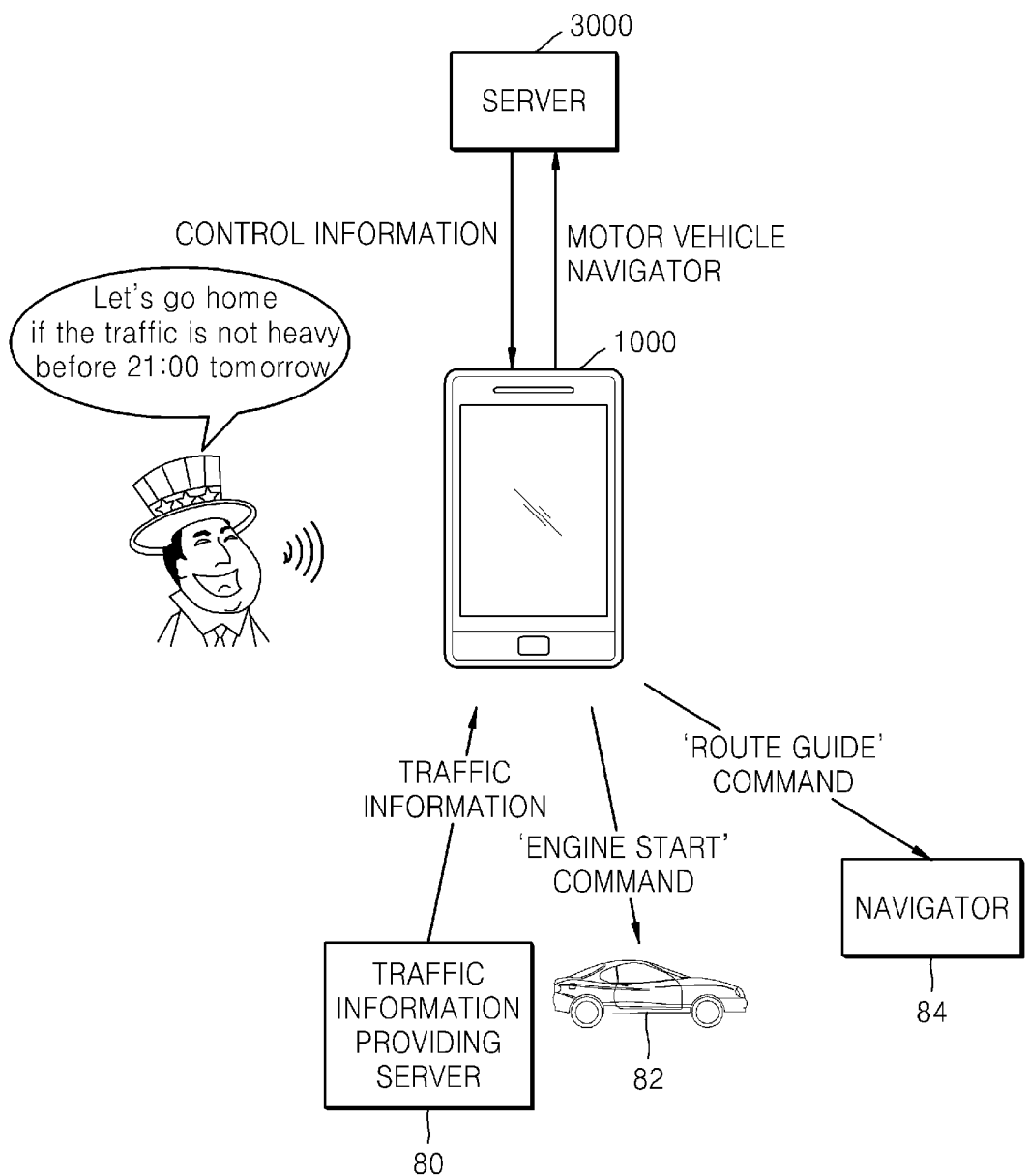
FIG. 8 is a schematic diagram of controlling an external apparatus, according to an exemplary embodiment.

FIG. 8 is a schematic diagram showing that the external apparatus 2000 is controlled according to user input information that is input to the device 1000, in a system for controlling the external apparatus 2000, according to an exemplary embodiment.

Referring to FIG. 8, if a user inputs voice data such as "Let's go home if the traffic is not heavy before 21:00 tomorrow" to the device 1000, the device 1000 may provide the voice data or text data transformed from the voice data, as user input information to the server 3000. The device 1000 may provide apparatus information of a motor vehicle 82 and a navigator 84 connectable with the device 1000, to the server 3000.

The server 3000 may determine the user's intention based on the user input information, and may determine a condition for controlling the external apparatus 2000. The server 3000 may determine whether the determined condition is satisfied, may generate control information for controlling the device 1000 and the external apparatus 2000, and may provide the generated control information to the device 1000.

The device 1000 may determine whether the condition is satisfied, by obtaining traffic information about a route from a current location of the device 1000 to home, from a traffic information providing server 80 based on the received control information. If the condition is satisfied, the device 1000 may transmit a control command instructing to start an engine to the motor vehicle 82 and may transmit a control command instructing to output route guidance information to the navigator 84.

Figure 9:
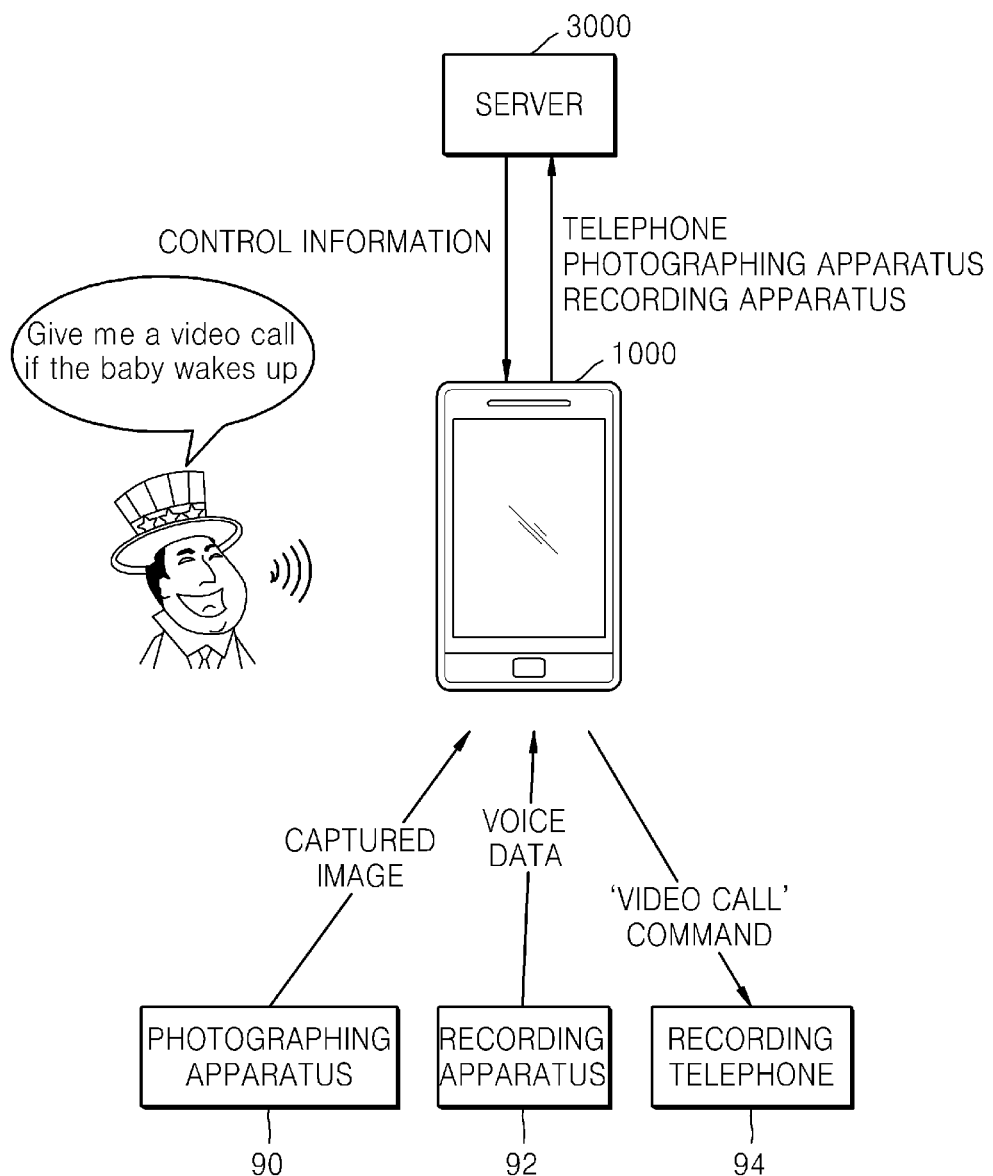
FIG. 9 is a schematic diagram of controlling an external apparatus, according to an exemplary embodiment.

FIG. 9 is a schematic diagram showing that the external apparatus 2000 is controlled according to user input information that is input to the device 1000, in a system for controlling the external apparatus 2000, according to an exemplary embodiment.

Referring to FIG. 9, if a user inputs voice data such as "Give me a video call if the baby wakes up" to the device 1000, the device 1000 may provide the voice data or text data transformed from the voice data, as user input information to the server 3000. The device 1000 may provide apparatus information of a photographing apparatus 90, a recording apparatus 92, and a telephone 94 connectable with the device 1000, to the server 3000.

The server 3000 may determine the user's intention based on the user input information, and may determine a condition for controlling the external apparatus 2000. The server 3000 may determine whether the determined condition is satisfied, may generate control information for controlling the device 1000 and the external apparatus 2000, and may provide the generated control information to the device 1000.

The device 1000 may determine whether the condition is satisfied, by obtaining a captured image from the photographing apparatus 90 and obtaining recorded voice data from the recording apparatus 92 based on the received control information. If the condition is satisfied, the device 1000 may transmit a control command instructing to make a video call to the telephone 94.

Figure 10:
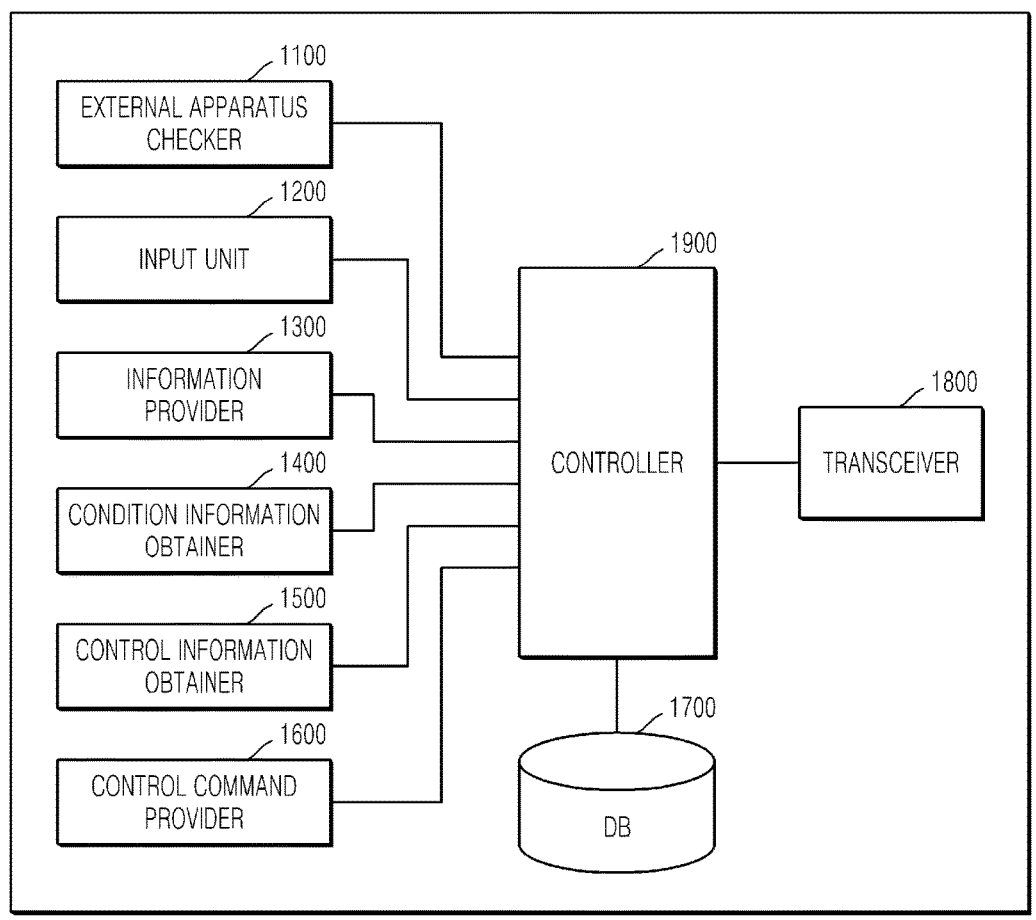
FIG. 10 is a block diagram of a device according to an exemplary embodiment.

FIG. 10 is a block diagram of the device 1000 according to an exemplary embodiment.

As illustrated in FIG. 10, the device 1000 includes an external apparatus checker 1100, an input unit 1200, an information provider 1300, a condition information obtainer 1400, a control information obtainer 1500, a control command provider 1600, a database (DB) 1700, a transceiver 1800, and a controller 1900.

The external apparatus checker 1100 checks the external apparatus 2000 controllable by the device 1000. The external apparatus checker 1100 may check the external apparatus 2000 controllable by the device 1000 from among the external apparatuses connectable with the device 1000. For example, the external apparatus checker 1100 may identify or select the external apparatus 2000 based on criteria, such as connectivity, compatibility, ability to share functionality, etc., with the device 1000.

The external apparatus checker 1100 may receive from the checked external apparatus 2000 apparatus information of the external apparatus 2000, but is not limited thereto. The external apparatus checker 1100 may receive the apparatus information of the external apparatus 2000 from a separate server (not shown). For example, if the device 1000 is connected with the external apparatus 2000 via a home gateway (not shown), the external apparatus checker 1100 may request the home gateway for the apparatus information of the external apparatus 2000. The apparatus information of the external apparatus 2000 may include information about at least one of an identification value of the external apparatus 2000, the type of the external apparatus 2000, and a command used to control the external apparatus 2000.

The input unit 1200 receives a user input about the device 1000, and generates user input information. The user input information may include text data or voice data, but is not limited thereto. Alternatively, the input unit 1200 may generate the user input information by using an email or a text message stored in the device 1000.

The information provider 1300 provides to the server 3000 various types of information for generating control information. The information provider 1300 may provide to the server 3000 at least one of the apparatus information of the external apparatus 2000, the user input information, and condition information.

The condition information obtainer 1400 may obtain the condition information from at least one of the device 1000, a separate server (not shown), and the external apparatus 2000. The condition information obtainer 1400 may obtain the condition information based on the control information obtained by the control information obtainer 1500 to be described below, but is not limited thereto. In order to satisfy a user's intention, the condition information obtainer 1400 may obtain the condition information related to a condition for controlling the external apparatus 2000.

The control information obtainer 1500 obtains the control information for controlling the device 1000 and the external apparatus 2000 according to the user's intention. The control information obtainer 1500 may receive the control information generated by the server 3000, but is not limited thereto. The control information obtainer 1500 may determine the user's intention based on the user input information, may determine the condition for controlling the external apparatus 2000, and may generate the control information. The control information obtainer 1500 may receive information about at least one of the condition for controlling the external apparatus 2000 and the user's intention from the server 3000, and may generate the control information. The control information obtainer 1500 will be described in detail below with reference to FIG. 11.

The control command provider 1600 provides a predetermined control command to the external apparatus 2000 based on the obtained control information. The control information may include a plurality of control commands aligned in a predetermined order, and the control command provider 1600 may provide the plurality of control commands to at least one external apparatuses 2000 in a predetermined order.

The DB 1700 stores various types of information to control the device 1000 and the external apparatus 2000 by the device 1000 according to the user's intention.

The transceiver 1800 transmits and receives to and from the external apparatus 2000 and the server 3000 the various types of information needed to control the device 1000 and the external apparatus 2000 by the device 1000 according to the user's intention.

The controller 1900 controls operations of the device 1000, and controls the external apparatus checker 1100, the input unit 1200, the information provider 1300, the condition information obtainer 1400, the control information obtainer 1500, the control command provider 1600, the DB 1700, and the transceiver 1800 in such a way that the device 1000 controls the device 1000 and the external apparatus 2000 according to the user's intention.

Some or all of the external apparatus checker 1100, the input unit 1200, the information provider 1300, the condition information obtainer 1400, the control information obtainer 1500, and the control command provider 1600 may be driven by software modules, but this is not limiting. Some or all of the external apparatus checker 1100, the input unit 1200, the information provider 1300, the condition information obtainer 1400, the control information obtainer 1500, and the control command provider 1600 may be hardware devices.

Also, at least some of the external apparatus checker 1100, the input unit 1200, the information provider 1300, the condition information obtainer 1400, the control information obtainer 1500, and the control command provider 1600 may be included in the controller 1900, and the external apparatus checker 1100, the input unit 1200, the information provider 1300, the condition information obtainer 1400, the control information obtainer 1500, the control command provider 1600, and the controller 1900 may be driven by one processor. However, an exemplary embodiment is not limited thereto.

Figure 11:
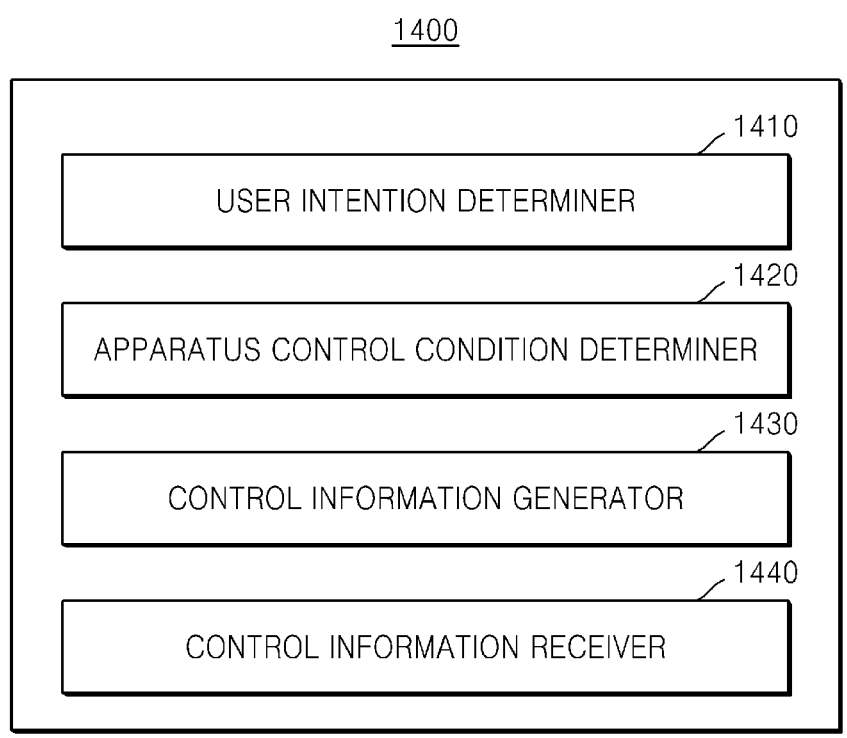
FIG. 11 is a block diagram of a condition information obtainer according to an exemplary embodiment.

FIG. 11 is a block diagram of the condition information obtainer 1400 according to an exemplary embodiment.

As illustrated in FIG. 11, the condition information obtainer 1400 may include a user intention determiner 1410, an apparatus control condition determiner 1420, a control information generator 1430, and a control information receiver 1440.

The user intention determiner 1410 determines a user's intention by analyzing the user input information. For example, the user intention determiner 1410 may use various natural language analysis methods. For example, the device 1000 may analyze text data as the user input information by using natural language processing such as morpheme analysis, syntax analysis, or named entity recognition. If the user input information is voice data, the user intention determiner 1410 may transform the voice data into text data, and may analyze the transformed text data. The user intention determiner 1410 may generate user intention information by analyzing the user input information. For example, if the user input information is "Wake me up at 7:00 if it doesn't rain tomorrow", the user intention determiner 1410 may generate the user intention information including time information such as "tomorrow, 7:00", condition information such as "if it doesn't rain", and operation information such as "wake me up". Alternatively, the user intention determiner 1410 may receive from the server 3000 the user intention information generated by the server 3000.

The apparatus control condition determiner 1420 determines a condition for controlling the external apparatus 2000 based on the user's intention. The apparatus control condition determiner 1420 may determine a condition that has to be satisfied to control operation of the external apparatus 2000 or the device 1000, based on the user intention information. For example, if the user intention information includes time information such as "tomorrow, 7:00" and condition information such as "if it doesn't rain", the apparatus control condition determiner 1420 may determine a time condition such as "tomorrow", a weather condition such as "sunny, cloudy", and a place condition such as "device location" as the condition for controlling the external apparatus 2000. Alternatively, the apparatus control condition determiner 1420 may receive from the server 3000 information about the condition determined the server 3000.

The control information generator 1430 generates control information about the device 1000 and the external apparatus 2000. The control information generator 1430 may determine whether the condition is satisfied, based on the condition information. If the condition determined by the device 1000 is satisfied, the control information generator 1430 may generate the control information for operating the device 1000 or the external apparatus 2000. The control information generator 1430 may generate the control information for operating the device 1000 or the external apparatus 2000, based on operation information, and apparatus information of the external apparatus 2000, which are included in the user intention information. The control information may include control commands about at least one of the external apparatus 2000 and the device 1000, and the control commands may be aligned in a predetermined order.

The control information receiver 1440 may receive from the server 3000 the control information generated by the server 3000.

Figure 12:
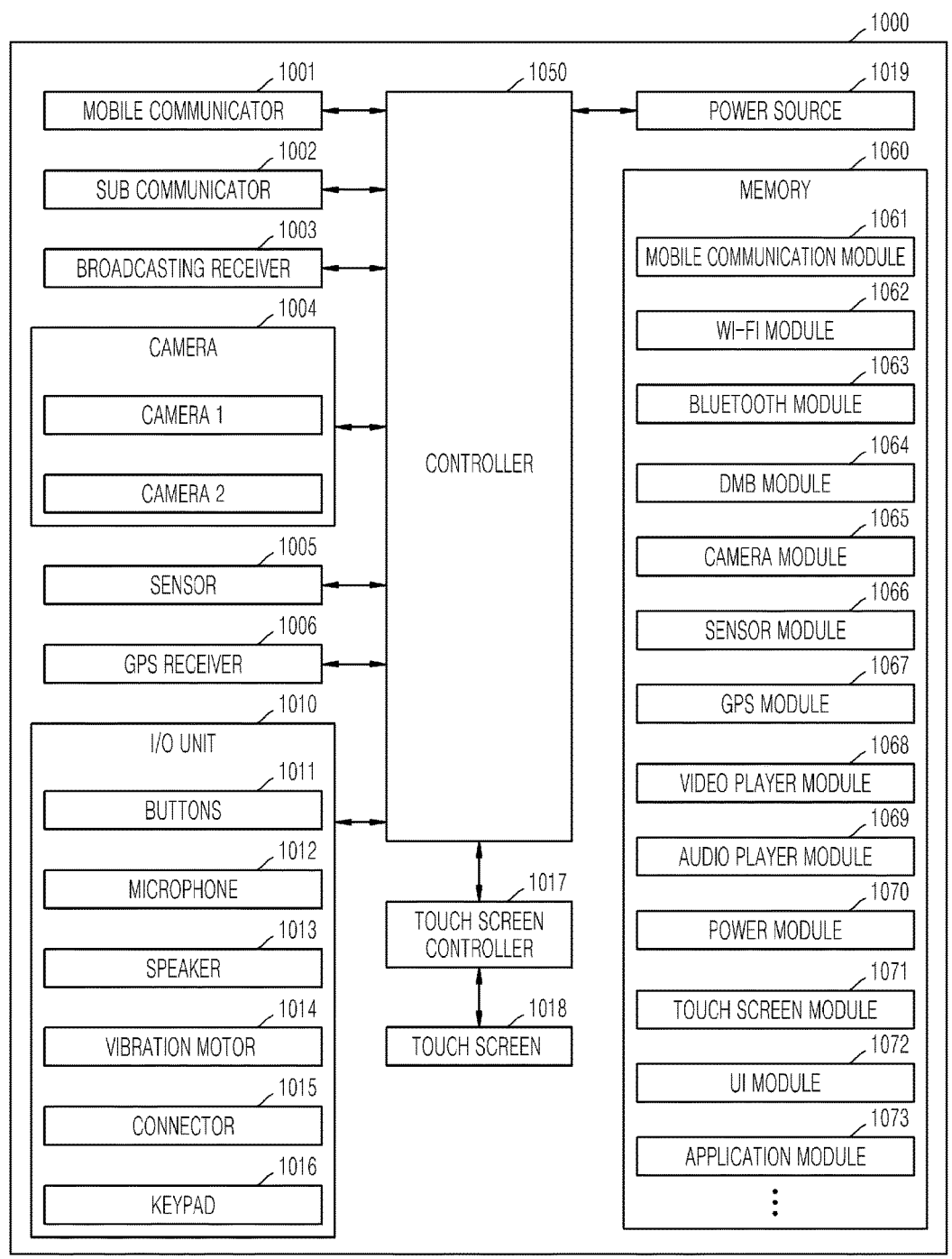
FIG. 12 is a block diagram of a device according to an exemplary embodiment.

FIG. 12 is a block diagram of the device 1000 according to an exemplary embodiment.

A mobile communicator 1001 performs, for example, call setup and data communication with a base station via a cellular network such as a 3G/4G network. A sub communicator 1002 performs a function for short-distance communication such as Bluetooth or NFC. A broadcasting receiver 1003 receives a digital multimedia broadcasting (DMB) signal.

A camera 1004 includes a lens and optical elements for capturing a photo or video.

A sensor 1005 may include a gravity sensor for sensing motion of the device 1000, an illumination sensor for sensing brightness of light, a proximity sensor for sensing proximity of a person, a motion sensor for sensing motion of a person, etc.

A GPS receiver 1006 receives a GPS signal from a satellite. Various services may be provided to a user by using GPS signals.

An input/output (I/O) unit 1010 provides an interface with the external apparatus 2000 or the user, and includes buttons 1011, a microphone 1012, a speaker 1013, a vibration motor 1014, a connector 1015, and/or a keypad 1016.

A touch screen 1018 receives a touch input of the user. A touch screen controller 1017 transmits to a controller 1050 the touch input received by the touch screen 1018. A power supply source 1019 is connected with a battery or an external power source to supply power to the device 1000.

The controller 1050 provides a control command to the external apparatus 2000 by executing programs stored in a memory 1060.

The programs stored in the memory 1060 may be classified into a plurality of modules according to their functions, for example, a mobile communication module 1061, a Wi-Fi module 1062, a Bluetooth module 1063, a DMB module 1064, a camera module 1065, a sensor module 1066, a GPS module 1067, a video player module 1068, an audio player module 1069, a power module 1070, a touch screen module 1071, a user interface (UI) module 1072, and an application module 1073.

Functions of most of the modules would be instinctively understood by one of ordinary skill in the art in view of their names and thus only the application module 1073 will be described here. The application module 1073 may check the external apparatus 2000 connected with the device 1000 by using the mobile communicator 1001 and the sub communicator 1002, and may receive apparatus information from the external apparatus 2000. The application module 1073 may receive a user input by using the I/O unit 1010, and may generate user input information. Furthermore, the application module 1073 may directly obtain condition information via the camera 1004, the sensor 1005, or the GPS receiver 1006, or may receive the condition information from the external apparatus 2000 or a separate server (not shown) by using the mobile communicator 1001 and the sub communicator 1002. Besides, the application module 1073 may obtain control information for controlling the device 1000 and the external apparatus 2000. The application module 1073 may determine the user's intention based on the user input information or may receive user intention information from the server 3000. The application module 1073 may determine a condition for controlling the external apparatus 2000 based on the user's intention, or may receive information about the condition from the server 3000. The application module 1073 may determine whether the condition is satisfied and may generate the control information for controlling the device 1000 and the external apparatus 2000. The application module 1073 may receive the control information generated by the server 3000. Furthermore, the application module 1073 may provide to the external apparatus 2000 a control command included in the control information.

Figure 13:
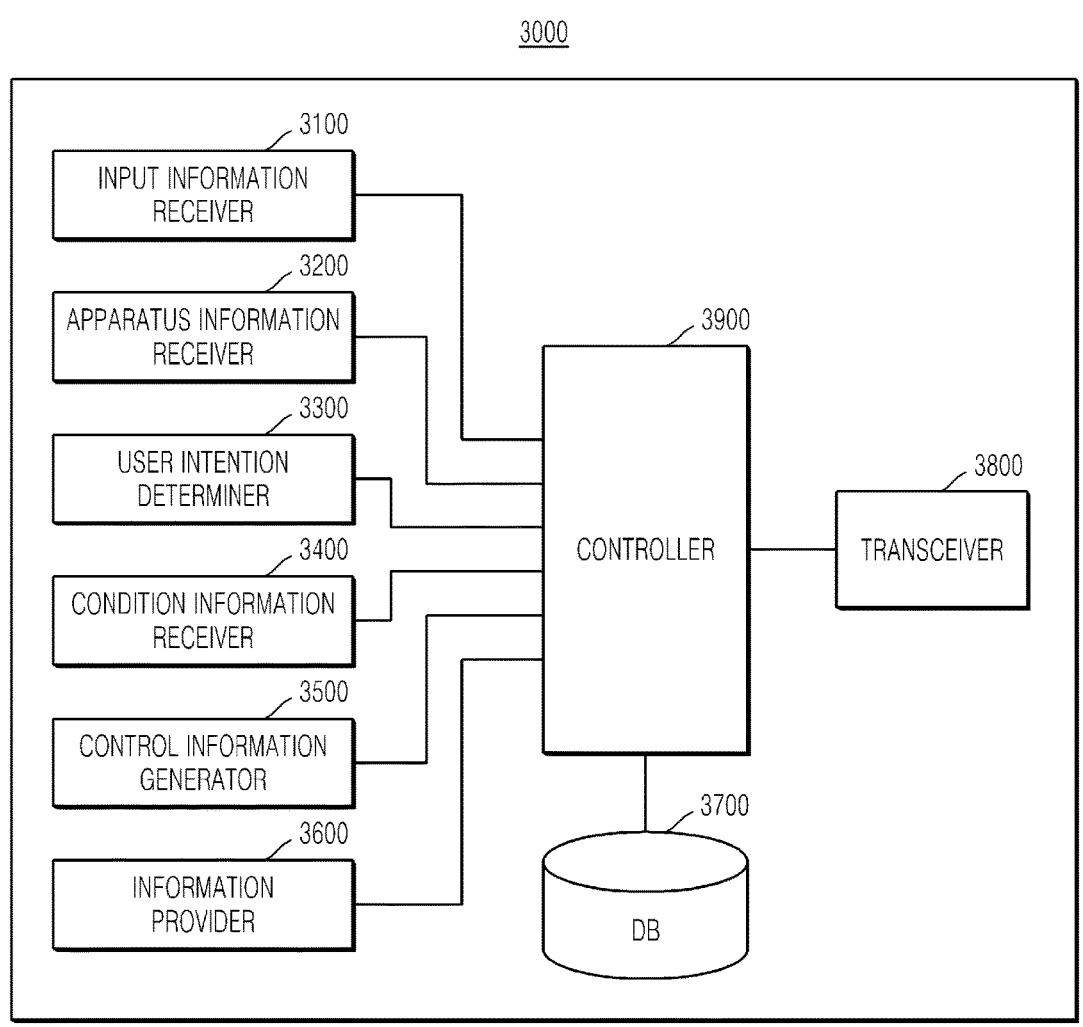
FIG. 13 is a block diagram of a server according to an exemplary embodiment.

FIG. 13 is a block diagram of the server 3000 according to an exemplary embodiment.

As illustrated in FIG. 13, the server 3000 includes an input information receiver 3100, an apparatus information receiver 3200, a user intention determiner 3300, a condition information receiver 3400, a control information generator 3500, an information provider 3600, a DB 3700, a transceiver 3800, and a controller 3900.

The input information receiver 3100 receives user input information from the device 1000. The user input information may include at least one of text data and voice data, but is not limited thereto.

The apparatus information receiver 3200 receives apparatus information of the external apparatus 2000 from the device 1000. The apparatus information may include information including at least one of an identification value of the external apparatus 2000, the type of the external apparatus 2000, and a command used to control the external apparatus 2000.

The user intention determiner 3300 determines a user's intention by analyzing the user input information. For example, the user intention determiner 3300 may use various natural language analysis methods.

The condition information receiver 3400 receives condition information from the device 1000. The condition information receiver 3400 may request the device 1000 for the condition information and may receive from the device 1000 the condition information obtained by the device 1000.

The control information generator 3500 generates control information for controlling the device 1000 and the external apparatus 2000. The control information generator 3500 may generate the control information based on at least one of the user intention information, the apparatus information, and the condition information. The control information generator 3500 may determine the user's intention based on the user input information, may determine the condition for controlling the external apparatus 2000, and may generate the control information.

The information provider 3600 may provide to the device 1000 at least one of the user intention information, and the condition information and the control information for controlling the external apparatus 2000.

The DB 3700 stores various types of information used when the server 3000 generates the control information for operating the device 1000 and the external apparatus 2000 according to the user's intention based on the user input information, and provides the generated control information to the device 1000.

The transceiver 3800 transmits to and receives from the device 1000 the various types of information used when the server 3000 generates the control information for operating the device 1000 and the external apparatus 2000 according to the user's intention based on the user input information, and provides the generated control information to the device 1000.

The controller 3900 controls operations of the server 3000, and controls the input information receiver 3100, the apparatus information receiver 3200, the user intention determiner 3300, the condition information receiver 3400, the control information generator 3500, the information provider 3600, the DB 3700, and the transceiver 3800 in such a way that the server 3000 generates the control information for operating the device 1000 and the external apparatus 2000 according to the user's intention based on the user input information, and provides the generated control information to the device 1000.

Some or all of the input information receiver 3100, the apparatus information receiver 3200, the user intention determiner 3300, the condition information receiver 3400, the control information generator 3500, and the information provider 3600 may be driven by software modules, but are not limited thereto. Some or all of the input information receiver 3100, the apparatus information receiver 3200, the user intention determiner 3300, the condition information receiver 3400, the control information generator 3500, and the information provider 3600 may be hardware devices.

Also, at least some of the input information receiver 3100, the apparatus information receiver 3200, the user intention determiner 3300, the condition information receiver 3400, the control information generator 3500, and the information provider 3600 may be included in the controller 3900, and the input information receiver 3100, the apparatus information receiver 3200, the user intention determiner 3300, the condition information receiver 3400, the control information generator 3500, the information provider 3600, and the controller 3900 may be driven by one processor. However, an exemplary embodiment is not limited thereto.

Exemplary embodiments may be implemented as a medium including computer-executable commands, e.g., a computer-executable program module. A computer-readable medium may be an arbitrary medium that may be accessed by a computer, and may include volatile and nonvolatile media, and detachable and non-detachable media. The computer-readable medium may include a computer recording medium and/or a communication medium. The computer recording medium includes volatile and nonvolatile media, and detachable and non-detachable media that are embodied by using an arbitrary method or technology for storing information such as a computer-readable command, a data structure, a program module, or other data. The communication medium may include a computer-readable command, a data structure, a program module, or other transmission mechanisms, and includes an arbitrary information transmission medium.

Exemplary embodiments may, however, be embodied in many different forms and should not be construed as being limited to the embodiments set forth herein; rather, the described exemplary embodiments are provided so that the disclosure will be thorough and complete, and will fully convey the inventive concept to those of ordinary skill in the art. For example, a single component may be separated into a plurality of components, while a plurality of components may be combined into one component.

The foregoing exemplary embodiments and advantages are merely exemplary and are not to be construed as limiting. The present teaching can be readily applied to other types of apparatuses. The description of the exemplary embodiments is intended to be illustrative, and not to limit the scope of the claims, and many alternatives, modifications, and variations will be apparent to those skilled in the art.

What is claimed is:

1. A method of controlling an external apparatus, the method comprising:
providing, to a server, a user input information, which is input by a user into a mobile device;
identifying one or more external apparatuses, from a plurality of external apparatuses, which are communicable with and controllable by the mobile device based on the user input information;
providing apparatus information of the one or more external apparatuses, to the server;
receiving, by the mobile device from the server, control information for controlling the one or more external apparatuses based on a user's input and the apparatus information; and
transmitting, by the mobile device, a control command to the one or more external apparatuses, the control command being generated based on the received control information.

2. The method of claim 1, further comprising determining a user's intention based on the user's input,
wherein a control condition for controlling the one or more external apparatuses is determined by the server based on the user's intention, and
wherein the control information is generated by the server based on the control condition.

3. The method of claim 2, wherein the control information comprises information for checking whether the control condition is satisfied and information for controlling an operation of the one or more external apparatuses when the control condition is satisfied.

4. The method of claim 2, further comprising obtaining condition information related to the control condition,
wherein the transmitting the control command comprises transmitting the control command to the one or more external apparatuses when it is determined that the control condition is satisfied based on the obtained condition information.

5. The method of claim 4, wherein the obtaining the condition information comprises obtaining the condition information from the one or more external apparatuses.

6. The method of claim 4, wherein the condition information comprises information about at least one among a location of the mobile device, an environmental condition around the mobile device, and traffic at a preset location.

7. The method of claim 1, wherein the control information comprises a plurality of control commands for controlling an operation of the one or more external apparatuses, and
the plurality of control commands are executed by the one or more external apparatuses in a predetermined order.

8. The method of claim 1, wherein the user input information comprises at least one among a text input by the user, a voice of the user, and a gesture of the user.

9. The method of claim 1, wherein the apparatus information comprises at least one among an identification value of the one or more external apparatuses, a type of the one or more external apparatuses, and a command used to control the one or more external apparatuses.

10. The method of claim 1, wherein the plurality of external apparatuses provide functions different from one another,
the identifying comprises selecting the one or more external apparatuses configured to execute a function related to a user's intention, from the plurality of external apparatuses, and
the control command is a command for operating the one or more external apparatuses to execute the function according to the user's intention.

11. A non-transitory computer-readable recording medium having recorded thereon a computer program which, when executed by a computer system, causes the computer system to execute the method of claim 1.

12. A method of providing control information, the method comprising:
receiving a user input information from a mobile device;
receiving an apparatus information of a plurality of external apparatuses;
selecting one or more external apparatuses, from the plurality of external apparatuses, which is communicable with and controllable by the mobile device based on the user input information;
generating the control information for controlling the one or more external apparatuses based on a user's input and the apparatus information; and
providing the control information to the mobile device, for transmission to the one or more external apparatuses.

13. The method of claim 12, further comprising determining a control condition for controlling the one or more external apparatuses, based on a user's intention,
wherein the user's intention is determined based on the user's input,
wherein the generating the control information comprises generating the control information based on the control condition.

14. The method of claim 13, wherein the control information comprises information for checking whether the control condition is satisfied and information for controlling an operation of the one or more external apparatuses when the control condition is satisfied.

15. The method of claim 13, wherein condition information related to the control condition is obtained based on the control information, and
wherein the control information is transmitted to the one or more external apparatuses when it is determined that the control condition is satisfied, based on the obtained condition information.

16. The method of claim 15, wherein the condition information is obtained by the mobile device by using the one or more external apparatuses.

17. The method of claim 15, wherein the condition information comprises information about at least one among a location of the mobile device, an environmental condition around the mobile device, and traffic at a preset location.

18. The method of claim 13, wherein the control information comprises a plurality of control commands for controlling an operation of the one or more external apparatuses, and
the plurality of control commands are executed by the one or more external apparatuses in a predetermined order.

19. The method of claim 12, wherein the user input information comprises at least one among a text input by a user, a voice of the user, and a gesture of the user.

20. The method of claim 12, wherein the apparatus information comprises at least one among an identification value of the one or more external apparatuses, a type of the one or more external apparatuses, and a command used to control the one or more external apparatuses.

21. The method of claim 12, wherein the plurality of external apparatuses provide functions different from one another,
the one or more external apparatuses configured to execute a function based on a user's intention, is selected from the plurality of external apparatuses, and
the control information is information for operating the one or more external apparatuses to execute the function according to the user's intention.

22. A mobile device comprising:
a memory configured to store a program; and
a processor configured to control one or more external apparatuses, of a plurality of external apparatuses, by executing the program,
wherein the program comprises commands which, when executed by the processor, cause the processor to:
identify the one or more external apparatuses communicable with and controllable by the mobile device based on user input information, from the plurality of external apparatuses;
provide apparatus information of the one or more external apparatuses, to a server;
receive, from the server, a control information for controlling the one or more external apparatuses, the control information being generated based on the user input information and the apparatus information; and
transmit a control command to the one or more external apparatuses based on the received control information, and
the control information is generated, based on a user's input.

23. The mobile device of claim 22, wherein a user's intention is determined based on the user's input,
wherein a control condition for controlling the one or more external apparatuses is determined based on the user's intention, and
wherein the control information is generated based on the control condition.

24. The mobile device of claim 23, wherein the control information comprises information for checking whether the control condition is satisfied and information for controlling an operation of the one or more external apparatuses when the control condition is satisfied.

25. The mobile device of claim 22, wherein the control information comprises a plurality of control commands for controlling an operation of the one or more external apparatuses, and
the plurality of control commands are executed by the one or more external apparatuses in a predetermined order.

26. A method comprising:
receiving a user's input from a mobile device;
selecting one or more external apparatuses configurable to be communicable with and controlled, by the mobile device, to perform a function which fulfills a user's intention, from external apparatuses which provide functions different from one another;
generating a control command to control the one or more external apparatuses, based on the user's input;
providing, to the mobile device, the control command; and
transmitting, from the mobile device, the control command to the one or more external apparatuses to fulfill the user's intention.

27. The method of claim 26, further comprising:
generating a control condition to be satisfied to fulfill the user's intention;
determining whether the control condition is satisfied; and
controlling the one or more external apparatuses to perform the function in response to the control condition being satisfied.

28. The method of claim 26, further comprising:
determining the user's intention by obtaining a user action command via at least one among a text input by a user, a voice of the user, and a gesture of the user.

29. The method of claim 28, wherein the user action command is a phrase which is input into the mobile device by one of a user text or a user natural voice and comprises a combinational instruction, and
the combinational instruction is directed to the mobile device and comprises an action, a time, and a condition.

30. The method of claim 29, wherein the phrase is parsed to distinguish the action, the time, and the condition contained in the combinational instruction, from one another, and
the user's intention is determined from the action, the time, and the condition of the combinational instruction, the action, the time, and the condition have been parsed from the combinational instruction.

* * * * *